US012260346B2

(12) United States Patent
Casas et al.

(10) Patent No.: US 12,260,346 B2
(45) Date of Patent: Mar. 25, 2025

(54) USING OPTICAL REMOTE SENSORS AND MACHINE LEARNING MODELS TO PREDICT AGRONOMIC FIELD PROPERTY DATA

(71) Applicant: Climate LLC, Saint Louis, MO (US)

(72) Inventors: Angeles Casas, San Francisco, CA (US); Xiaoyuan Yang, Pleasanton, CA (US); Ho Jin Kim, San Francisco, CA (US); Steven Ward, Moraga, CA (US)

(73) Assignee: CLIMATE LLC, Saint Louis, MO (US)

( * ) Notice: Subject to any disclaimer, the term of this patent is extended or adjusted under 35 U.S.C. 154(b) by 987 days.

(21) Appl. No.: 17/143,536

(22) Filed: Jan. 7, 2021

(65) Prior Publication Data

US 2021/0209490 A1 Jul. 8, 2021

Related U.S. Application Data

(60) Provisional application No. 62/958,211, filed on Jan. 7, 2020.

(51) Int. Cl.
*G06N 20/00* (2019.01)
*G06N 5/04* (2023.01)

(52) U.S. Cl.
CPC ............. *G06N 5/04* (2013.01); *G06N 20/00* (2019.01)

(58) Field of Classification Search
CPC ................. G06N 5/04; G06N 20/00
See application file for complete search history.

(56) References Cited

U.S. PATENT DOCUMENTS 8,712,148 B2 4/2014 Paris et al.
8,738,243 B2 5/2014 Sauder et al.
(Continued)

FOREIGN PATENT DOCUMENTS

EP 3406124 A1 11/2018

OTHER PUBLICATIONS

Chlingaryan et al ("Machine learning approaches for crop yield prediction and nitrogen status estimation in precision agriculture: A review" 2018) (Year: 2018).*
(Continued)

*Primary Examiner* — Lut Wong
(74) *Attorney, Agent, or Firm* — Harness, Dickey & Pierce, P.L.C.

(57) ABSTRACT

In some embodiments, a computer-implemented method for predicting agronomic field property data for one or more agronomic fields using a trained machine learning model is disclosed. The method comprises receiving, at an agricultural intelligence computer system, agronomic training data; training a machine learning model, at the agricultural intelligence computer system, using the agronomic training data; in response to receiving a request from a client computing device for agronomic field property data for one or more agronomic fields, automatically predicting the agronomic field property data for the one or more agronomic fields using the machine learning model configured to predict agronomic field property data; based on the agronomic field property data, automatically generating a first graphical representation; and causing to display the first graphical representation on the client computing device.

20 Claims, 14 Drawing Sheets

(56) References Cited

U.S. PATENT DOCUMENTS

| | | |
|---|---|---|
| 8,767,194 B2 | 7/2014 | Preiner et al. |
| 9,922,405 B2 | 3/2018 | Sauder et al. |
| 10,768,340 B2 | 9/2020 | Koch et al. |
| 11,256,916 B2 | 2/2022 | She et al. |
| 2015/0094916 A1 | 4/2015 | Bauerer et al. |
| 2017/0061052 A1 | 3/2017 | Gates et al. |
| 2018/0035605 A1* | 2/2018 | Guan ................. G06V 10/7715 |
| 2018/0075545 A1* | 3/2018 | Richt .................. G06V 20/188 |
| 2019/0156437 A1* | 5/2019 | Dail ................... G06Q 10/0635 |
| 2019/0327881 A1 | 10/2019 | Xu et al. |
| 2019/0384998 A1 | 12/2019 | Chen et al. |
| 2019/0387687 A1* | 12/2019 | Nitsch .................. G06T 7/0012 |
| 2019/0392596 A1 | 12/2019 | Yang et al. |

OTHER PUBLICATIONS

Huang et al ("Agricultural remote sensing big data: Management and applications" 2018) (Year: 2018).*

Santra et al ("Estimation of soil hydraulic properties using proximal spectral reflectance in visible, near-infrared, and shortwave-infrared (VIS-NIR-SWIR) region" 2009). (Year: 2009).*

* cited by examiner

Fig. 2
(a)
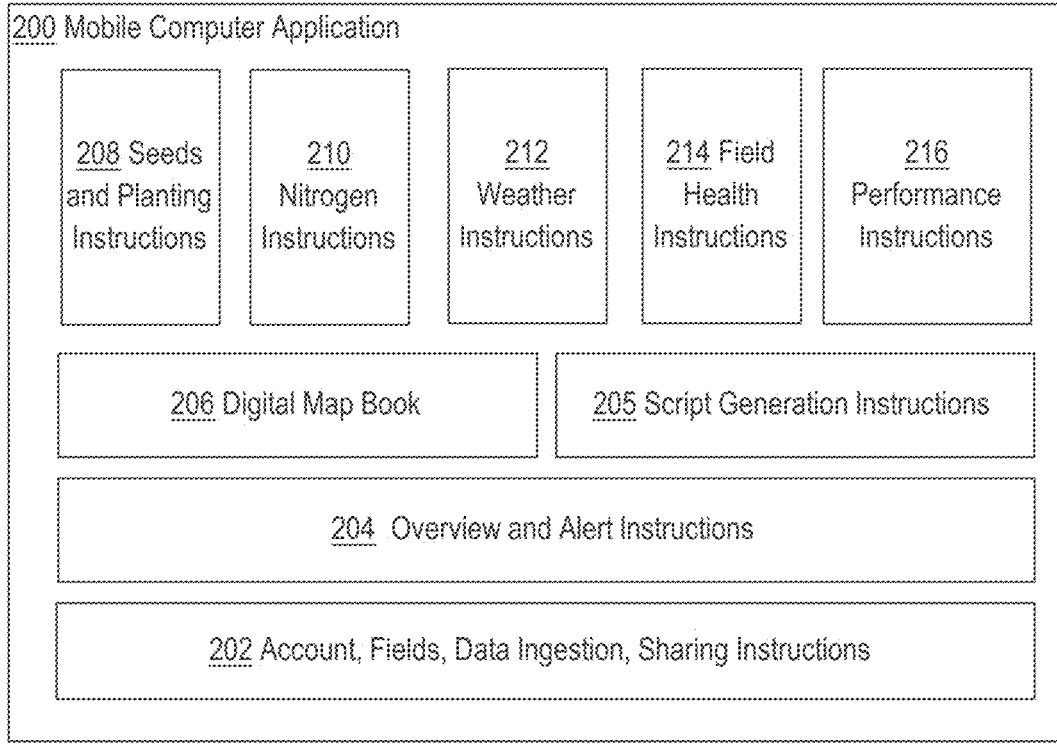
(b)
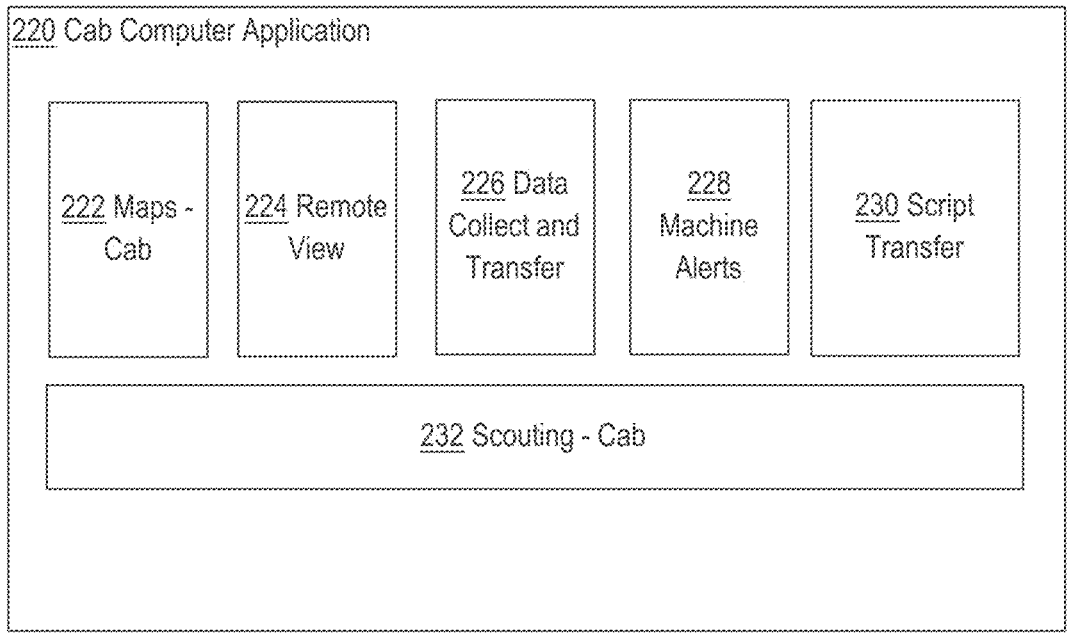

FIG. 5

Data Manager

| Nitrogen | Planting | Practices | Soil |

Planting 1(4 Fields)
Crop Corn Product
Plant Date: 2016-04-12
RLU 112 | Pop: 34000
[Edit] [Apply]

Planting 2(0 Fields)
Crop Corn Product
Plant Date: 2016-04-15
RLU 83 | Pop: 34000
[Edit] [Apply]

Planting 3(0 Fields)
Crop Corn Product
Plant Date: 2016-04-13
RLU 83 | Pop: 34000
[Edit] [Apply]

Planting 4(1 Fields)
Crop Corn Product
Plant Date: 2016-04-13
RLU 112 | Pop: 34000
[Edit] [Apply]

[+ Add New Planting Plan]

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1  Corn \| 100 \| Boone, IA | Corn | --- | DMC82-M | 112 | 160 | 34000 | Apr |
| ☐ Austin, MN 1  Corn \| 100 \| Fredricks, MN | Corn | --- | DMC82-M | 114 | [160] | 36000 | Apr |
| ☐ Boone, IN 1  Corn \| 100 \| Boone, IA | Corn | --- | DMC82-M | 112 | 150 | 34000 | Apr |
| ☐ Champaign 1  Corn \| 100 \| Champaign, IL | Corn | --- | --- | 112 | 200 | 34000 | Apr |
| ☐ E. Nebraska 1  Corn \| 100 \| Burt, NE | Corn | --- | --- | 112 | 160 | 34000 | Apr |

FIG. 6

USING OPTICAL REMOTE SENSORS AND MACHINE LEARNING MODELS TO PREDICT AGRONOMIC FIELD PROPERTY DATA

BENEFIT CLAIM; REFERENCE TO RELATED APPLICATIONS

The application claims the priority to the Provisional U.S. Patent Application No. 62/958,211, entitled "Using Optical Remote Sensors and machine Learning Models to Predict Agronomic Field Property Data," filed on Jan. 7, 2020, the entire contents of which are hereby incorporated by reference under 35 U.S.C. § 119(e) for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2021 The Climate Corporation.

FIELD OF THE DISCLOSURE

The present disclosure relates to the technical field of agronomic data prediction. The disclosure relates more specifically to the technical field of using trained machine learning models to predict agronomic field property data for one or more agronomic fields. One technical field of the present disclosure is mapping and displaying predicted agronomic field property data. Another technical field of the present disclosure is preprocessing agronomic training data for machine learning models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Acquiring agronomic field property data of agronomic fields can be important to effectively manage crop development. Agronomic field property data may provide valuable inputs in optimizing crop and yield, disease risk management, fungicide control, delineation of management zones, estimation of variable rate nitrogen application, and irrigation schedules.

One important agronomic field property is a crop residue cover (CRC). In some embodiments, a CRC is defined as the percentage of an area of ground surface covered by crop residue. Crop residues are materials left on agronomic fields or orchards after crops have been harvested. For example, crop residue may include stems, leaves, or seed pods. Presence of the CRC in a field may protect soil erosion, water runoff, and depletion of nutrients and agrochemicals that reach the surface waters of agronomic fields. Increasing the CRC may be associated with increasing soil organic matter and water retention capacity in the soil, as well as increasing susceptibility of the soil to diseases.

Another important agronomic field property is a tillage practice type. Tillage is defined as a set of operations performed for various reasons such as a seedbed preparation, weed and pest control, nutrient incorporation, and water management. There are two main types of tillage practice types: a conventional type and a conservation type. Conventional tillage practices are the traditional methods of soil cultivation. They usually include loosening of the soil to leave the soil surface bare. Conservation tillage practices, on the other hand, retain a large portion of the previous year's crop residue with limited disturbance to the soil surface. Determining the tillage practice type is a key aspect of agricultural systems, and therefore, can have a critical impact on crop yields.

Currently, measuring a CRC and determining tillage practice type for agronomic fields are time-consuming, labor-intensive, and somewhat subjective. Measuring CRC and determining tillage practice type require on ground measurements of agronomic fields as well as direct input from growers. For example, a line-transect measurement method may be used to estimate the CRC. The method requires stretching, for example, a 50-foot measuring tape, marked at one-foot intervals, diagonally across the crop rows. The CRC is then estimated by counting the number of marks that intersect crop residue multiplied by two. An average of multiple measurements is made to ensure the accuracy of the estimation. Another method commonly used is a meter stick method. The meter-stick method requires a meter stick, marked into, for example, 25 equal segments, and placing the stick at right angles to crop rows. The CRC is calculated by counting the number of marks on the meter stick that lie directly over a piece of residue and multiplying that number by, for example, four. Like the line-transect measurement method, an average of multiple measurements is required in the meter-stick method to ensure the accuracy of the estimation.

In addition to being time-consuming and labor intensive, both measuring methods may be difficult to deploy in agronomic fields due to the geographic or topological limitations of certain agronomic fields.

Thus, there is a need for methods for measuring agronomic field properties that are easy to scale across geography without a need for performing on ground measurements, that overcome the geographic limitations, and that accept direct input from growers.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

DETAILED DESCRIPTION

Figure 1:
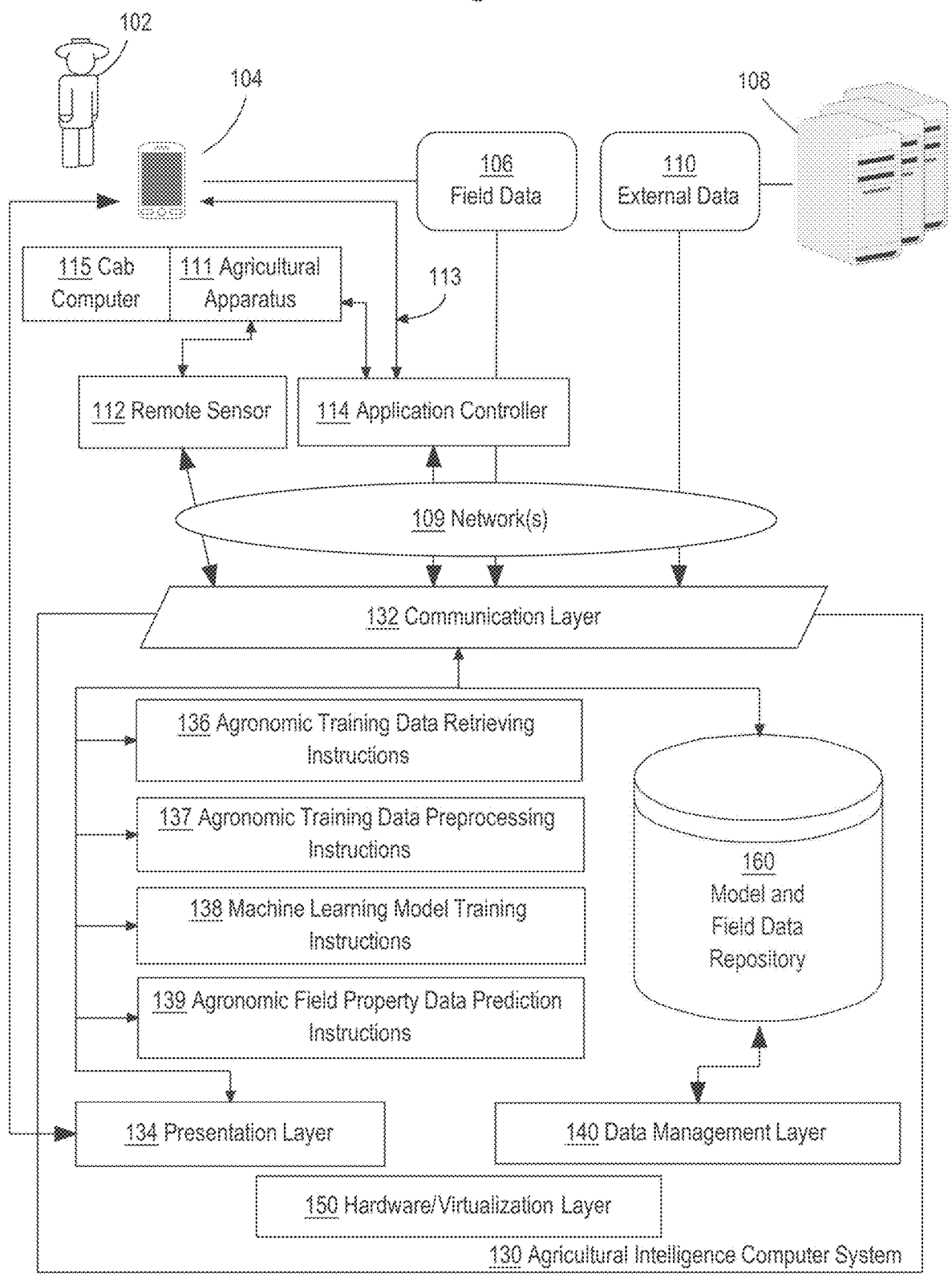
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. AGRONOMIC TRAINING DATA
   3.1. OPTICAL REMOTE SENSING DATA
   3.2. MEASURED FIELD DATA
      3.2.1. POINT-SPOT SELECTION
      3.2.2 LINE-TRANSECT METHOD
   3.3. PRECIPITATION DATA
   3.4 EXAMPLES OF AGRONOMIC MODELS
      3.4.1. GAUSSIAN MODELS
      3.4.2 LINEAR REGRESSION MODELS
4. TRAINING DATA PREPROCESSING AND MODEL TRAINING
   4.1. OPTICAL REMOTE SENSING DATA PREPROCESSING
      4.1.1. CLOUD FILTER
      4.1.2. VEGETATION/SNOW FILTER
   4.2. MEASURED FIELD DATA PREPROCESSING
   4.3. TRAINING MACHINE LEARNING MODELS
5. PREDICTING AND MAPPING AGRONOMIC FIELD PROPERTY DATA
6. TECHNICAL BENEFITS OF CERTAIN EMBODIMENTS 1. General Overview Systems and methods are described for using a machine learning model which is trained using agronomic training data to predict agronomic field property data for one or more agronomic fields.

In some embodiments, the agronomic training data are received by an agricultural intelligence computer system. The agronomic training data comprises one or more of: optical remote sensing data, measured field data, or precipitation data from a plurality of agronomic fields. In one embodiment, the optical remote sensing data are produced by a satellite with a multispectral sensor configured to collect data in a plurality of frequency bands.

The agronomic training data may be provided to a machine learning model to cause the model to learn how to predict agronomic field property data for agronomic fields. Examples of machine learning models include the models that implement multiple linear regression approaches, the models that implement Gaussian process machine learning approaches, and other models.

The models used to predict agronomic field property data may be scaled and customized for a particular agronomic application. The scaling and updating of the models to be able to customize crop residue maps may be achieved in collaboration with, for example, third-party providers and service providers. Furthermore, in collaboration with specialized teams and third party providers, the models may be customized to be able to access temporal dynamics of a residue cover between the short and tall corn.

A machine learning model may be trained with the agronomic training data to predict agronomic field property data for one or more agronomic fields. In some embodiments, the received agronomic training data are preprocessed prior to being used to train the machine learning model. Preprocessing may include, for example, filtering agronomic training data to comply with a specified time window, such as a 24-hour-time window, a 7-day-time window, a 30-day-time window, and the like. Tillage operations may have an impact on the accuracy of CRC data collected from agronomic fields, thus, the time window may be selected to minimize the impact of tillage operations on CRC data. Preprocessing may also include removing agronomic data that have been impacted from cloud cover from further processing. Removed agronomic data may include pixel-based images of agronomic fields that have been entirely, or partially, obscured by clouds. Agronomic training data that have been impacted by precipitation may also be removed during preprocessing. Removed agronomic training data may include, for example, optical remote sensing data for corresponding agronomic fields with recorded precipitation prior to the acquisition of the optical remote sensing data. A graphical representation of the predicted agronomic field property data is then generated and caused to display on a computing device.

In some embodiments, the predicted agronomic field property data are CRC data. The graphical representation of the predicted agronomic field property data of one or more agronomic fields may be generated and displayed on a field manager computing device in response to receiving user inputs and requests pertaining to the agronomic fields. In some embodiments, the machine learning model is one of: a multiple linear regression model, or a Gaussian process regression model. Predicted agronomic field property data may be divided into different classes based on specific ranges of data values. Each class of the predicted agronomic field property data may represent a different type of the estimated tillage practice.

In some embodiment, the graphical representation of the predicted agronomic field property data comprises pixel-based images having pixel values corresponding to predicted agronomic field property data.

2. Example Agricultural Intelligence Computer System

2.1 Structural Overview

FIG. 1 illustrates an example computer system that is configured to perform the functions described herein, shown in a field environment with other apparatus with which the system may interoperate. In one embodiment, a user 102 owns, operates, or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensor 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In some embodiments, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In some embodiments, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
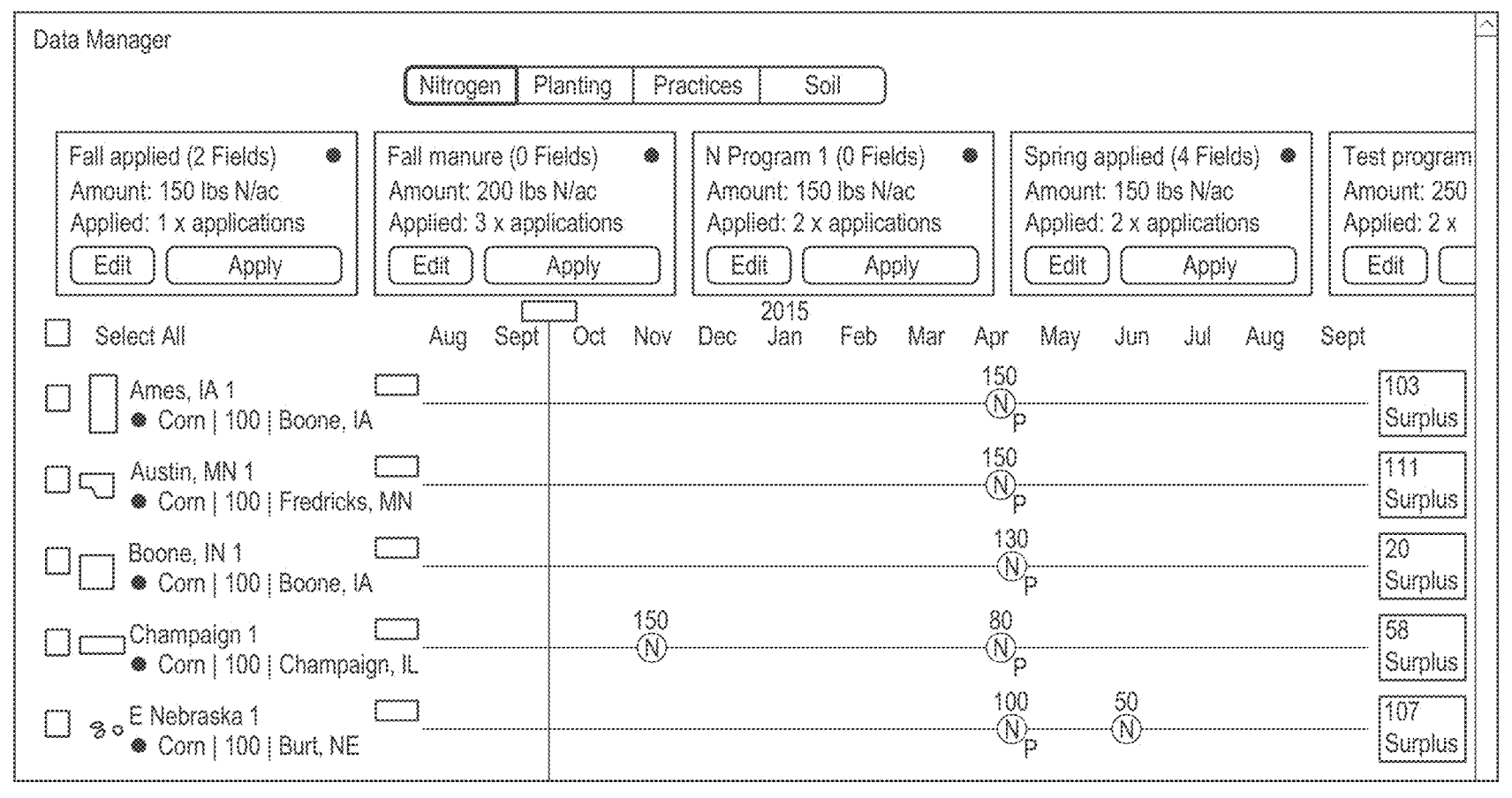

FIG. 5 depicts an example embodiment of a timeline view for data entry. Using the display depicted in FIG. 5, a user computer can input a selection of a particular field and a particular date for the addition of an event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In some embodiments, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs. N/ac in early April. The data manager may provide an interface for editing a program. In some embodiments, when a particular program is edited, each field that has selected the particular program is edited. For example, in FIG. 5, if the "Spring applied" program is edited to reduce the application of nitrogen to 130 lbs. N/ac, the top two fields may be updated with a reduced application of nitrogen based on the edited program.

In some embodiments, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In some embodiments, model and field data are stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In some embodiments, each of agronomic training data retrieving instructions 136, agronomic training data preprocessing instructions 137, machine learning model training instructions 138, and agronomic field property data prediction instructions 139 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, the agronomic training data retrieving instructions 136 may comprise a set of pages in RAM that contain instructions which when executed cause performing the agronomic training data retrieving functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of agronomic training data retrieving instructions 136, agronomic training data preprocessing instructions 137, machine learning model training instructions 138, and agronomic field property data prediction instructions 139 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Agronomic training data retrieving instructions 136 comprise instructions which, when executed by one or more processors, cause the agricultural intelligence computer system 130 to computationally retrieve and store agronomic training data from one or more sources. Agronomic training data preprocessing instructions 137 comprise computer readable instructions which, when executed by one or more processors, cause the agricultural intelligence computer system 130 to computationally preprocess agronomic training data based, at least in part, on a plurality of parameters. Machine learning model training instructions 138 comprise computer readable instructions which, when executed by one or more processors, cause the agricultural intelligence computer system 130 to train and generate a machine learning model for predicting agronomic field property data using, at least in part, the agronomic training data. Agronomic field property data prediction instructions 139 comprise computer readable instructions which, when executed by one or more processors, cause the agricultural intelligence computer system 130 to, in response to receiving a request from a client computing device for agronomic field property data for one or more agronomic fields, computationally predict the agronomic field property data of the one or more agronomic fields based, at least in part, on the trained machine learning model, and generate one or more graphical representations for display based, at least in part, on the predicted agronomic field property data of the one or more agronomic fields.

Figure 4:
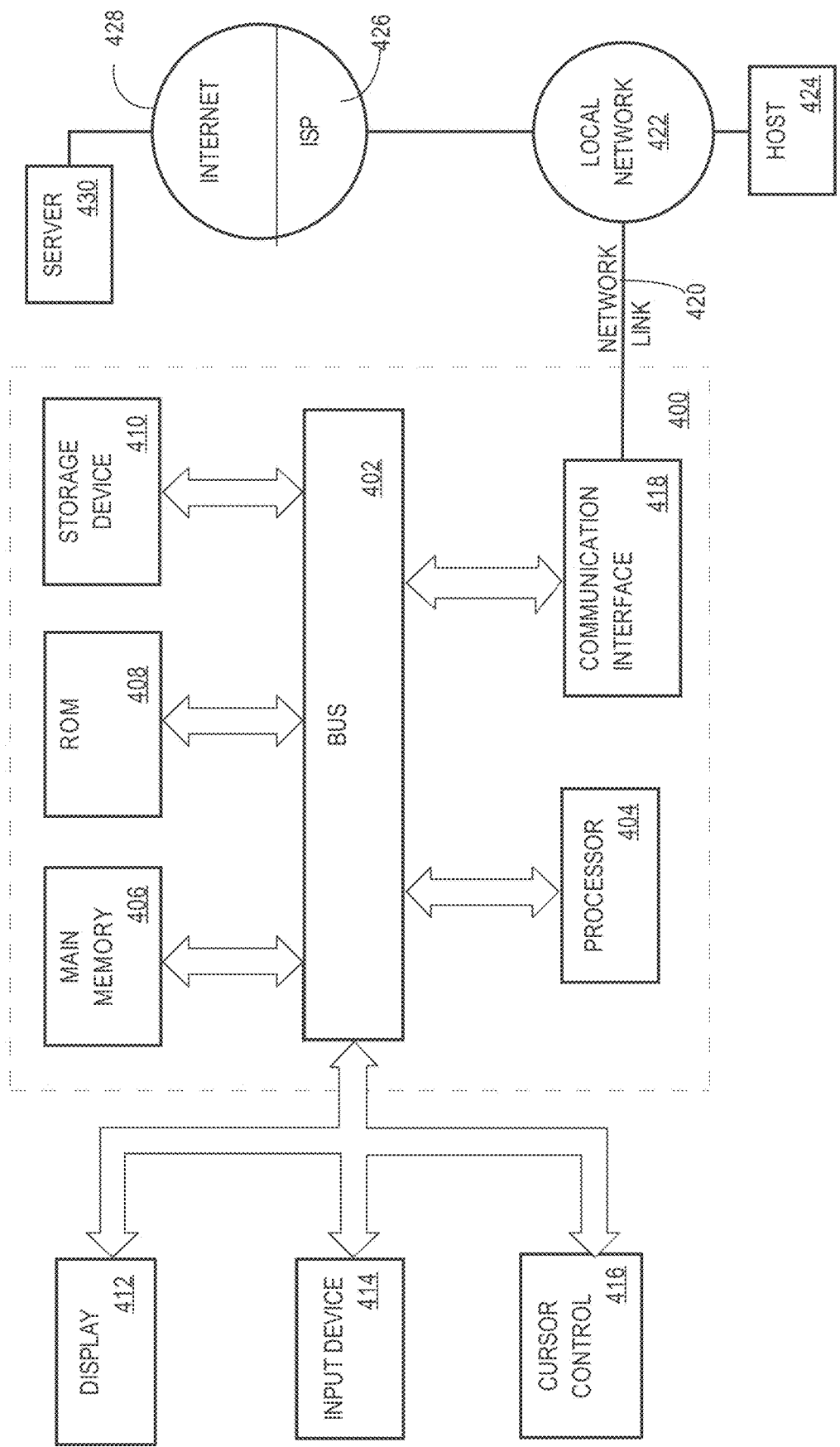
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In some embodiments, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In some embodiments, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of smartphones, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate, or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In some embodiments, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging, and visual insights into field performance. In one embodiment, overview, and alert instructions 204 are programmed to provide an operation-wide view of what is important to the grower, and timely recommendations to act or focus on particular issues. This permits the grower to focus time on what needs attention, to save time and preserve yield throughout the season. In one embodiment, seeds, and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement, and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly, or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights, and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In some embodiments, external data server computer 108 stores external data 110, including soil data representing soil composition for the one or more fields and weather data representing temperature and precipitation on the one or more fields. The weather data may include past and present weather data as well as forecasts for future weather data. In some embodiments, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In some embodiments, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the fields. In some embodiments, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In some embodiments, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In some embodiments, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In some embodiments, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In some embodiments, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In some embodiments, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In some embodiments, examples of sensors 112 that may be used with tillage equipment include position sensors for tools such as shanks or discs; tool position sensors for such tools that are configured to detect depth, gang angle, or lateral spacing; downforce sensors; or draft force sensors. In some embodiments, examples of controllers 114 that may be used with tillage equipment include downforce controllers or tool position controllers, such as controllers configured to control tool depth, gang angle, or lateral spacing.

In some embodiments, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In some embodiments, examples of controllers 114 that may be used with such apparatus include pump speed controllers; valve controllers that are programmed to control pressure, flow, direction, PWM and the like; or position actuators, such as for boom height, subsoiler depth, or boom position.

In some embodiments, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In some embodiments, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In some embodiments, examples of sensors 112 that may be used with grain carts include weight sensors, or sensors for auger position, operation, or speed. In some embodiments, examples of controllers 114 that may be used with grain carts include controllers for auger position, operation, or speed.

In some embodiments, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage, and configure any of the foregoing sensors. Examples are disclosed in U.S. patent application Ser. No. 14/831,165 and the present disclosure assumes knowledge of that other patent disclosure.

In some embodiments, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In some embodiments, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In some embodiments, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of the quantity of the crop that is produced, or in some examples the revenue or profit obtained from the produced crop.

In some embodiments, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
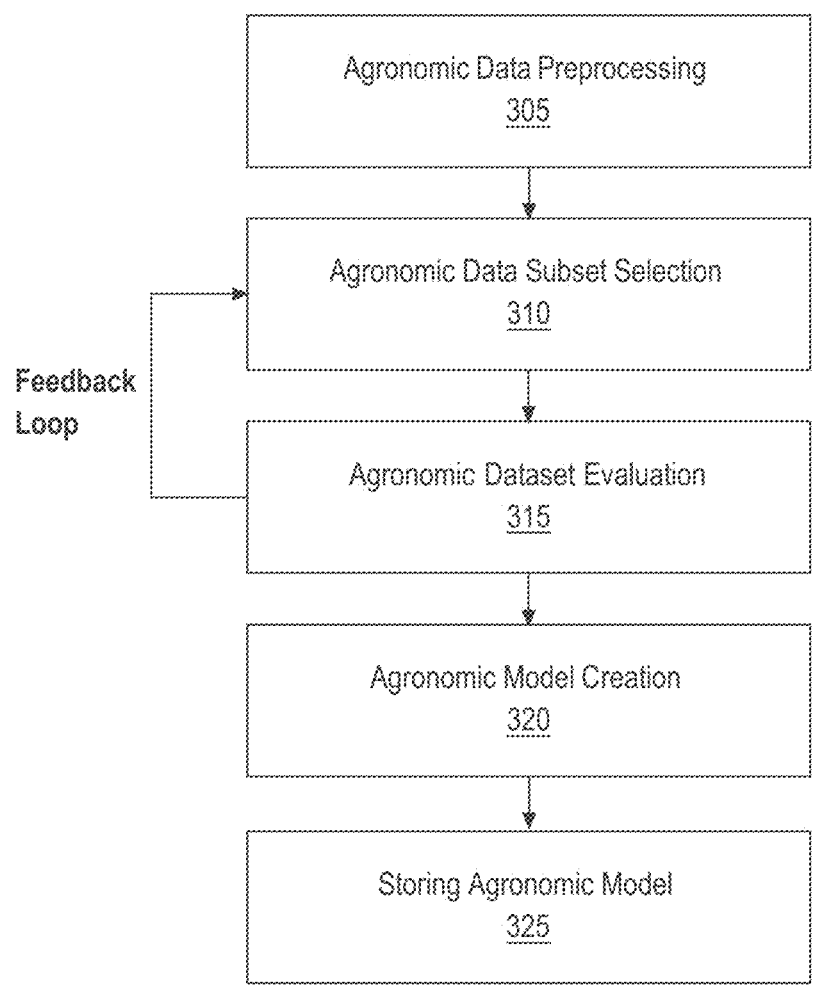
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In some embodiments, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In some embodiments, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In some embodiments, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example-Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. The input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated-services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Agronomic Training Data

Figure 7A:
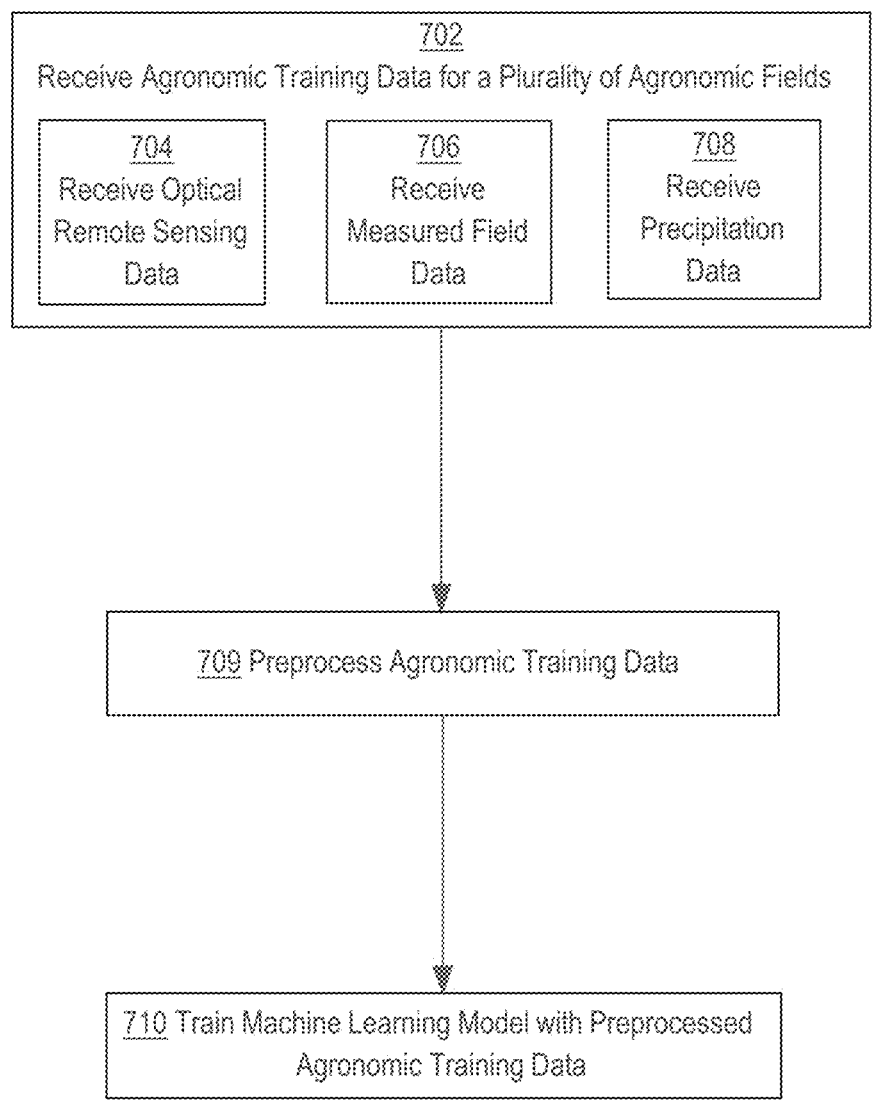
FIG. 7A depicts an example method of receiving agronomic training data and using preprocessed agronomic training data to train a machine learning model.

FIG. 7A depicts an example method of receiving agronomic training data and using preprocessed agronomic training data to train a machine learning model. Examples of machine learning models include the models that implement multiple linear regression approaches, the models that implement Gaussian process machine learning approaches, and other models. Details about the models are described in Section 3.4.

The models used to predict agronomic field property data may be scaled and customized for a particular agronomic application. Furthermore, the models may be customized to be able to access temporal dynamics of a residue cover between the short and tall corn.

In some embodiments, the agronomic field property data include CRC data, and an agricultural intelligence computer system is configured to predict a wide variety of agronomic field property data based on user selection. For example, a field manager computing device 104 may prompt a user 102 to select a specific type of agronomic field property data to predict from a plurality agronomic field property data types. Other agronomic field property data may include organic matter data, moisture level data, soil type data, nitrogen estimation data, and green vegetation data.

At step 702, an agricultural intelligence computer system receives agronomic training data for a plurality of agronomic fields. The agronomic training data may comprise one or more of: optical remote sensing data, measured field data, or precipitation data for the plurality of agronomic fields. Each agronomic field from the plurality of agronomic fields may be assigned an identifier which associates each agronomic field with their corresponding agronomic training data. For example, an agronomic field A may be associated with an optical remote sensing data set A, a precipitation data set A, and a measured field data set A. In some embodiments, agronomic training data that correspond to the same one or more agronomic fields is batched as a single file and stored in model and field data repository 160, as shown in FIG. 1. In other embodiments, the agronomic training data are stored in a memory storage unit.

3.1. Optical Remote Sensing Data

At step 704, the agricultural intelligence computer system receives optical remote sensing data of a plurality of agronomic fields. The optical remote sensing data may be produced by a satellite with a multispectral sensor configured to collect data in a plurality of frequency bands. For example, the SENTINEL-2 satellite operated by the EUROPEAN SPACE AGENCY collects data in a plurality different frequency bands including a shortwave infrared (SWIR) band, a near-infrared (NIR) band, and a visible (VIS) band.

In some embodiments, the agricultural intelligence computer system receives any number of the above described frequency bands and/or different frequency bands for use as agronomic training data in machine learning model training. All frequency bands of the SENTINEL-2 satellite may be received at regular time intervals and used as agronomic training data to train a machine learning model. In some embodiments, frequency bands are automatically selected and received based on the agronomic field property data type that may be requested by users.

The agricultural intelligence computer system may receive optical remote sensing data for a plurality of agronomic fields in the form a plurality of images sent directly or indirectly by one or more satellites. Each image may comprise a graphical representation of a particular frequency band corresponding to one or more agronomic fields from the plurality of agronomic fields.

Figure 8A:
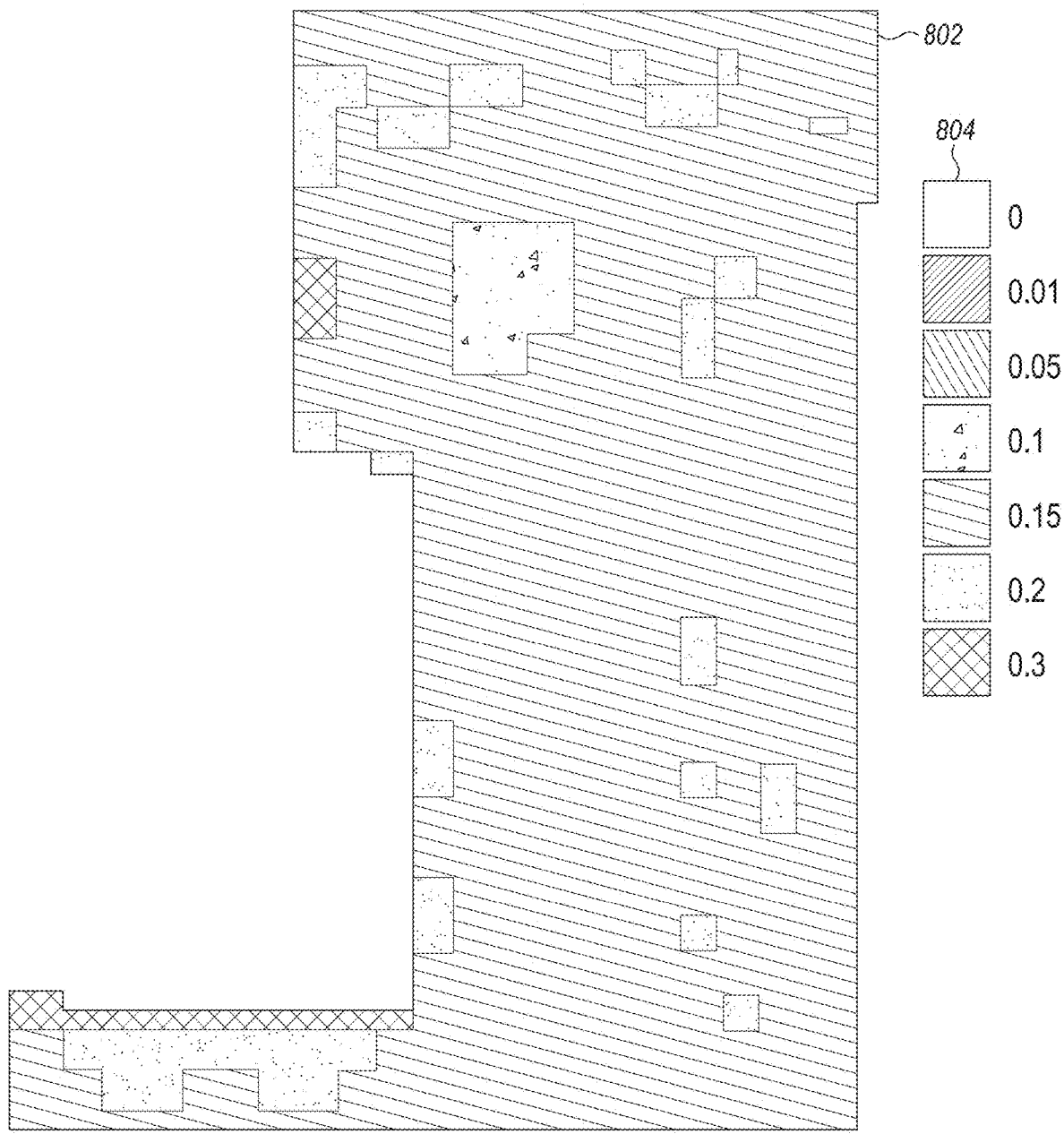
FIG. 8A depicts an example of received optical remote sensing data for use as agronomic training data for a machine learning model.

In one embodiment, the optical remote sensing data are received as plurality of pixel-based images 802 of a plurality frequency bands for one or more agronomic fields as shown in FIG. 8A. The plurality of pixel-based images 802 may be received, directly or indirectly, from a satellite with a multispectral sensor configured to collect data.

FIG. 8A depicts an example of received optical remote sensing data for use as agronomic training data for a machine learning model. Each pixel from the plurality of pixel-based images 802 represents a frequency band value 804 corresponding to various locations from the one or more agronomic fields. Additionally, or alternatively, the optical remote sensing data may be received as a series of pixel values representing frequency band values from the corresponding pixel-based images 802 of the plurality frequency bands. For example, the optical remote sensing data for an agronomic field may be a list of pixel values paired with their corresponding image coordinates within a pixel-based image.

In another embodiment, the optical remote sensing data are received in the form of frequency band layers overlaid onto aerial photographs of the one or more corresponding agronomic fields.

Figure 8B:
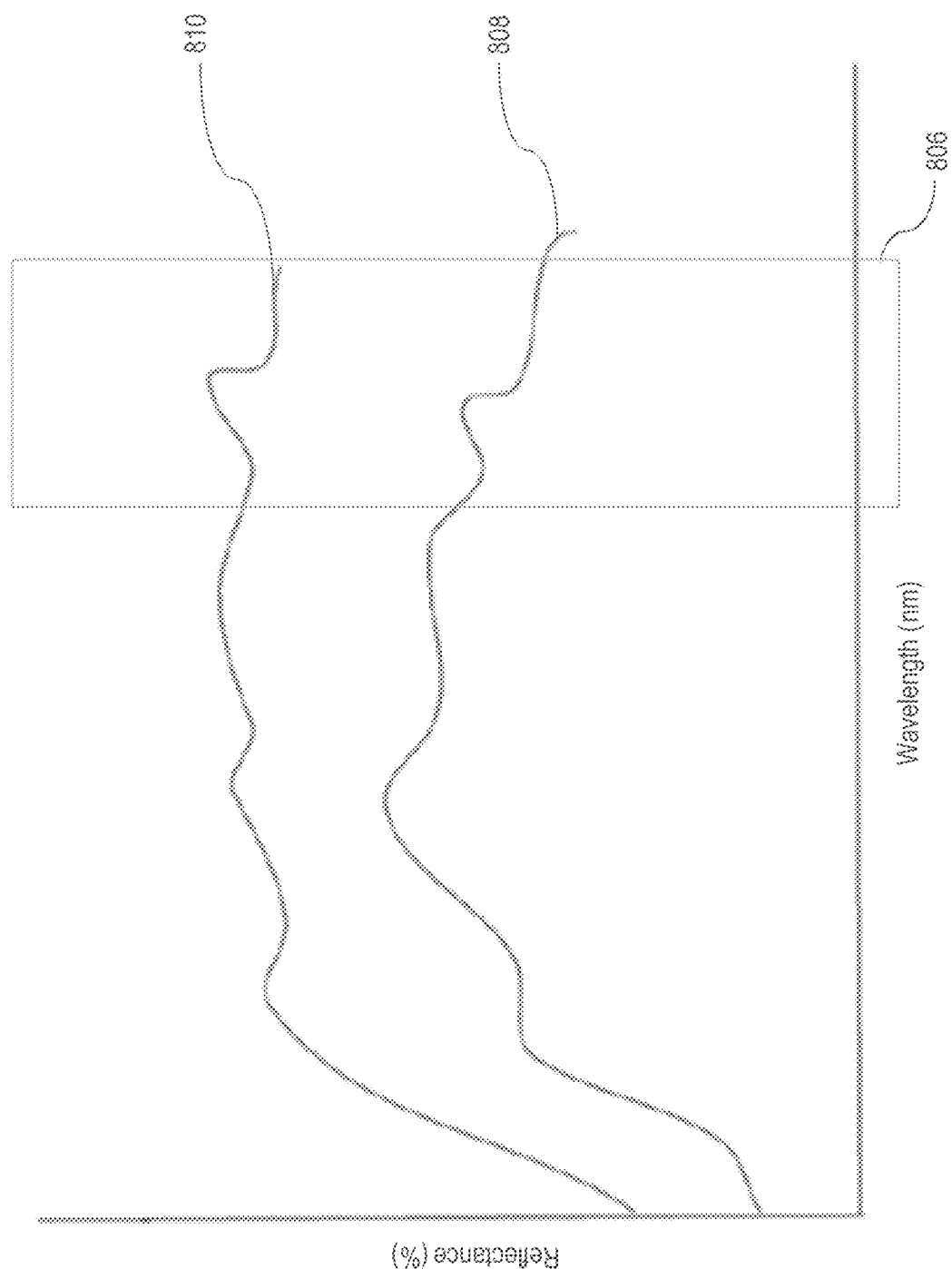
FIG. 8B depicts an example of a shortwave infrared (SWIR) band corresponding a to particular agronomic field or a particular area of a particular agronomic field.

Optical remote sensing data may also be received as spectral reflectance curves as plots of reflectance as a function of wavelength as shown in FIG. 8B. The optical remote sensing data may be received, directly or indirectly, from a satellite with a multispectral sensor configured to collect data. FIG. 8B depicts an example of a SWIR band corresponding to a particular agronomic field. Spectral reflectance curves may represent optical remote sensing data of one or more agronomic fields or a particular location within an agronomic field. Optical remote sensing data collected at a specific wavelength region of a particular frequency band may be used for model training for agronomic field property data prediction. The specific wavelength region may be based on unique spectral absorption features of certain crop and soil properties of agronomic fields.

FIG. 8B depicts an example of a SWIR band corresponding to a particular agronomic field or a particular area of a particular agronomic field. For example, optical remote sensing data may be collected at a specific wavelength region 806 and used as agronomic training data for model training for CRC data prediction. In order to obtain accurate optical remote sensing data in the SWIR band for crop residue of an agronomic field, the reflectance data of crop residue 808 should be distinguished from the reflectance data of other features from the agronomic field, such as the reflectance data of soil 810, the reflectance data of live crop, and the reflectance data of moisture. While the reflectance data of crop residue 808 and the reflectance data of soils 810 are similar throughout most of the 400-1500 nm wavelength region of a SWIR band, crop residues have a unique absorption feature in the 2100-2350 nm wavelength region 806 which is associated with the cellulose and lignin in crop residues and are absent in soils. Thus, optical remote sensing data collected in the 2100-2350 nm wavelength regions of SWIR 806 may be used as agronomic training data for model training in CRC data prediction.

In other embodiments, a plurality of wavelength regions of a particular frequency band is used as an agronomic training data model. For example, the Normalized Difference Tillage Index (NDTI), which comprises two separate wavelength regions of a SWIR band centered at the 1600-1700 nm wavelength region and the 2100-2300 nm wavelength region respectively, may be used for model training for CRC data prediction.

In some embodiments, the received optical remote sensing data are stored in model and field data repository 160 as shown in FIG. 1. In other embodiments, in-memory storage is used.

3.2. Measured Field Data

At step 706, the agricultural intelligence computer system receives measured field data of a plurality of agronomic fields. The data may be preprocessed, or otherwise evaluated, based on, for example, the digital images provided to the agricultural intelligence computer.

3.2.1. Point-Spot Selection

The measurements of the CRC residue are usually taken in a fall season after harvest or tillage and/or in a spring season during a pre-spring-tillage and post-spring tillage priori to emergence.

Generally, there are two major considerations in the point selection for taking measurements of the CRC residue in a field: (1) residue variation within a field, and (2) coverage of 3×3 satellite footprint. If residue measurements were not previously assessed in the field, then the overall crop residue distribution on the field may be determined, and based on the expert knowledge, three areas with a homogeneous distribution that could be extrapolated to an area of approximately (30×30 meters) of residue cover may be defined. Typically, the three areas represent (1) a lower ("Low") than a field average residue cover, (2) an average ("Avg") field residue cover, and (3) a higher ("High") than a field average residue cover. Usually, the measurement points are at least 100 m apart for avoiding introducing adjacent pixels while analyzing imagery data. Additionally, a buffer distance of at least 50 m from the boundary of the field is maintained.

However, if residue measurements were previously assessed for the field, then the previously recorded residue sites may be revisited, and new locations for new measurement points may be determined. The locations for the new measurement points may be determined by a grower by selecting the new locations using a user interface depicting a graphical representation of the field. The user interface may be generated using an application executing on the grower's device or a web-based application served from a server to the grower's device. Selecting the new locations for the new measurements is referred to as placing (or dropping) new pins (or markings). Once the pins are dropped at the new locations using the user interface, the new residue observations may be obtained. This usually applies to monitoring changes of residue cover that may be, for example, blown out or moving by wind or rain during the winter period. In some situations, additional residue cover estimates are recorded if such estimates would be helpful.

3.2.1. Line-Transect Method

In some embodiments, a line-transect measurement method may be used to estimate the CRC. This method allows counting materials left on an agricultural field with a regular distance interval such as, for example, every foot. Examples of the materials include residue, soils, weeds, vegetation, and the like. In some implementations, the method involves stretching, for example, a 100-foot measuring tape, marked at one-foot intervals, diagonally across the crop rows. The digital images depicting the corresponding regions of the agricultural field may be provided and used to, for example, manually estimate the CRC. The CRC may be estimated by counting the number of marks that intersect crop residue. An average of multiple measurements (from, for example, multiple images) may be used to ensure the accuracy of the estimation.

For example, at each transect 100-foot line, ten photographs may be taken using a portable camera carried by a grower as the grower walks along the line or using cameras mounted on the poles installed along the line. Each of the photographs is usually taken at a height of about 1 m (around the waist) from the ground along the transect. This allows covering a footprint size of 1 m×1 m on the ground. A photograph is roughly taken every ~4 meters. The shadows or any body parts are avoided in the pictures. Also, the local solar noon (+/−1 hour from the solar noon) are avoided for taking the pictures. The process is repeated for all transects.

In other embodiments, the plurality of agronomic fields is a plurality of Research Fields (RF). The measured field data may be produced by scouters collecting data directly or indirectly from a plurality of RFs. For example, data collected/produced by scouters may comprise, but not limited to, data values representing one or more of: identification data of scouted RFs, farm type corresponding to scouted RFs, CRC measurements of a particular point of a plurality of points in scouted RFs, date and time of the measurements, photographs of the points of measurements, geographical coordinates of the points of measurements, or the particular crops planted before harvest associated with scouted RFs. In some embodiments, the method of measuring the CRC of a scouted RF comprises visually categorizing the level of CRC of each point of a plurality of points of a particular RF into three different classes: high, medium, and low; and estimating the CRC within a three-meter circular area around each point. In some embodiments, the method of photographing the points of measurements comprises taking two vertical photographs, one facing north and the other facing south, of the point of measurement. Data collected/produced by scouters may additionally comprise, but not limited to, data values representing one or more of: the harvest dates of the particular crops, tillage data for scouted RFs, CRC measurements of a particular point of the scouted RF prior and after tillage, and the date of planting for next season for the scouted RF.

In one embodiment, the measured field data of a plurality of agronomic fields is uploaded into a model and field data repository 160 as shown in FIG. 1, using an application, for later retrieval by an agricultural intelligence computer system. For example, the application used to upload measured field data may be the mobile application CLIMATE FIELD-VIEW, which is commercially available from The Climate Corporation, San Francisco, Calif. The measured field data received by the agricultural intelligence computer system from the model and field data repository 160 for use as agronomic training data may be organized into a comma-separated values (CSV) format.

3.3. Precipitation Data

At step 708, the agricultural intelligence computer system receives precipitation data of a plurality of agronomic fields. In order to provide accurate agronomic training data to training machine learning models to predict agronomic field property data for one or more agronomic fields, precipitation data of the plurality of agronomic fields may be collected and received by an agricultural intelligence computer system.

In some embodiments, precipitation data is provided to an intelligence computer from various sources. Some of the sources include the global data sources that are often publicly available and that provide the precipitation data upon request and that provide the precipitation data in various formats.

Examples of the global data sources include ERAS, which is the fifth generation ECMWF atmospheric reanalysis of the global climate covering the period from January 1950 to present. ECMWF ReAnalysis5 (ERAS) is the European Center for Medium-Range Weather Forecasts' (ECMWF) global reanalysis product and is generally considered the industry standard. ERAS is produced by the Copernicus Climate Change Service (C3S) at ECMWFERA5, and provides hourly data on many atmospheric, land-surface and sea-state parameters together with estimates of uncertainty. ERAS's primary strengths are that the data are available at hourly increments on a 0.25×0.25 deg (~30 km) global grid. Furthermore, it provides a consistent formulation throughout the data period (with exception noted below). Also, it includes an extensive array of weather variables (see partial list below). Moreover, it is well documented and transparent, with ongoing improvements in development.

In some embodiments, ERAS data are available on regular latitude-longitude grids at 0.25°×0.25° resolution, with atmospheric parameters on 37 pressure levels. ERAS covers the time period from 1950 to the present and continues to be extended forward in time, with daily updates being available 5 days behind real time.

Upon receiving the ERAS precipitation data, the data is used to prepare input precipitation data for the agricultural intelligence system. The preparation usually includes accumulating the daily values for 15 consecutive days and using the cumulative values as the input to the agricultural intelligence system.

Some of the information obtained from ERAS may be used to determine a relative water content (RWC) of crop residues. The RWC of crop residues may impact the optical remote sensing data obtained from crop residues and soils. NDTI reflectance factor data values of crop residue are similar to NDTI reflectance factor data values of soil with an RWC of 60%-70%. For example, optical remote sensing data of an agronomic field with no crop residue but with soil having an RWC of 60%-70%, will likely mimic optical remote sensing data of an agronomic field with crop residue but with soil having an RWC of 0%. These adjustments are taken into consideration in training machine learning models to predict agronomic field property data for one or more agronomic fields.

Other sources of precipitation data for a plurality of agronomic fields may include a quantitative precipitation estimation (QPE) service. In some embodiments, the QPE service can be obtained from a commercially available or publicly available service that provides digital weather data such as The Weather Company (TWC).

Precipitation data of a plurality of agronomic fields may comprise daily precipitation values of the plurality of agronomic fields. The daily precipitation values may include daily precipitation values collected on days prior to the acquisition of optical remote sensing data of one or more agronomic fields of the plurality of agronomic fields. In some embodiments, daily precipitation values comprise a set of values including the daily precipitation values for each of the fifteen days prior to the acquisition of optical remote sensing data from the one or more agronomic fields. Additionally, or alternatively, the precipitation data may be cumulative. For instance, the precipitation data may comprise a set of values including the sum of the daily precipitation values of the three days, five days, ten days, and fifteen days prior to the acquisition of optical remote sensing data from the one or more agronomic fields.

In some embodiments, the received precipitation data are stored in model and field data repository 160 as shown in FIG. 1. In other embodiments, in-memory storage may be used.

3.4. Examples of Agronomic Models

Examples of machine learning models include the models that implement Gaussian process machine learning approaches, the models that implement linear regression approaches, and other models. The models may be scaled and customized for a particular agronomic application. The scaling and updating of the models to allow to customize crop residue maps in collaboration with, for example, third-party providers and service providers. Furthermore, in collaboration with specialized teams and third party providers, the models may be customized to access temporal dynamics of a residue cover between the short and tall corn.

3.4.1. Gaussian Models

Models that implement Gaussian process machine learning are usually based on a Gaussian process. The Gaussian process is a collection of random variables indexed by time or space, such that every finite collection of those random variables has a multivariate normal distribution. That means that every finite linear combination of them is normally distributed. The distribution of a Gaussian process is a joint distribution of all the random variables, and as such, it is a distribution over functions with a continuous domain, e.g., time or space.

A machine-learning algorithm that involves a Gaussian process uses lazy learning and a measure of the similarity between points to predict the value for an unseen point from training data. The prediction is not just an estimate for that point, but also has uncertainty information that is referred to as a one-dimensional Gaussian distribution. For multi-output predictions, multivariate Gaussian processes may be used, for which the multivariate Gaussian distribution is the marginal distribution at each point.

Gaussian processes are useful in statistical modelling, benefiting from properties inherited from the normal distribution. For example, if a random process is modelled as a Gaussian process, the distributions of various derived quantities can be obtained explicitly. Such quantities may include the average value of the process over a range of times and the error in estimating the average using sample values at a small set of times. While exact models often scale poorly as the amount of data increases, multiple approximation methods have been developed which often retain good accuracy while drastically reducing computation time.

3.4.2. Linear Regression Models

Models that implement linear regression approaches are used to model the relationship between a scalar response and one or more explanatory variables (also referred to as dependent and independent variables). The case of one explanatory variable is called a simple linear regression, while the case of multiple explanatory variables is called a multiple linear regression.

In linear regression, the relationships are modeled using linear predictor functions whose unknown model parameters are estimated from the data. Such models are called linear models. Usually, the conditional mean of the response given the values of the explanatory variables (or predictors) is assumed to be an affine function of those values. Alternatively, the conditional median or some other quantile is used. Like all forms of regression analysis, linear regression focuses on the conditional probability distribution of the response given the values of the predictors, rather than on the joint probability distribution of all of these variables, which is the domain of multivariate analysis.

Linear regression models are often fitted using the least squares approach. However, they may also be fitted using other approaches; for example, by minimizing the "lack of fit" in some other norm, or by minimizing a penalized version of the least squares cost function as in ridge regression or using a lasso approach. The least squares approach can be used to fit models that are not linear models.

4. Training Data Preprocessing and Model Training

Preprocessing of the training data for the purpose of training a model may be accomplished in a variety of ways. One way is to employ a large-scale processing platform that complies with complex and demanding operational, functional and performance requirements. Such a platform may be also configured to comply with non-functional engineering requirements regarding maintainability, robustness and evolvability. The platform may be implemented as a cloud-based scalable, extensible, and globally distributed system that provides a large archive and a catalog of remotely-sensed imagery products (both space-borne and air-borne). The platform may also be configured with geospatial data processing functions that are to fulfill the business requirements of Climate and its customers or end-users. Furthermore, the platform offers highly-available and fully automated scalable services for the acquisition, ingest, processing, analysis, distribution, and visualization of remotely-sensed data sets.

The processing platform may further be configured to query optical remote sensing images and preprocess the received data to remove the contamination caused by, for example, depictions of clouds, depictions of cloud shadows, and the like. In some embodiments, the preprocessing includes generating and applying, for example, cloud mask layers to check for contaminated pixels in the images. The mask layers may be implemented as part of the processing platform or may be provided by third-party vendors.

At step 709, the agricultural intelligence computer system preprocesses the agronomic training data prior to being used to train the machine learning model. The agronomic training data may be preprocessed to ensure the accuracy and overall quality of the received agronomic training data. In some embodiments, agronomic training data are preprocessed based on the specific parameters provided by users. Agronomic training data preprocessing may comprise one or more of: querying data, filtering data, selecting data, discarding data, or quality checking data.

4.1. Optical Remote Sensing Data Preprocessing

Figure 9:
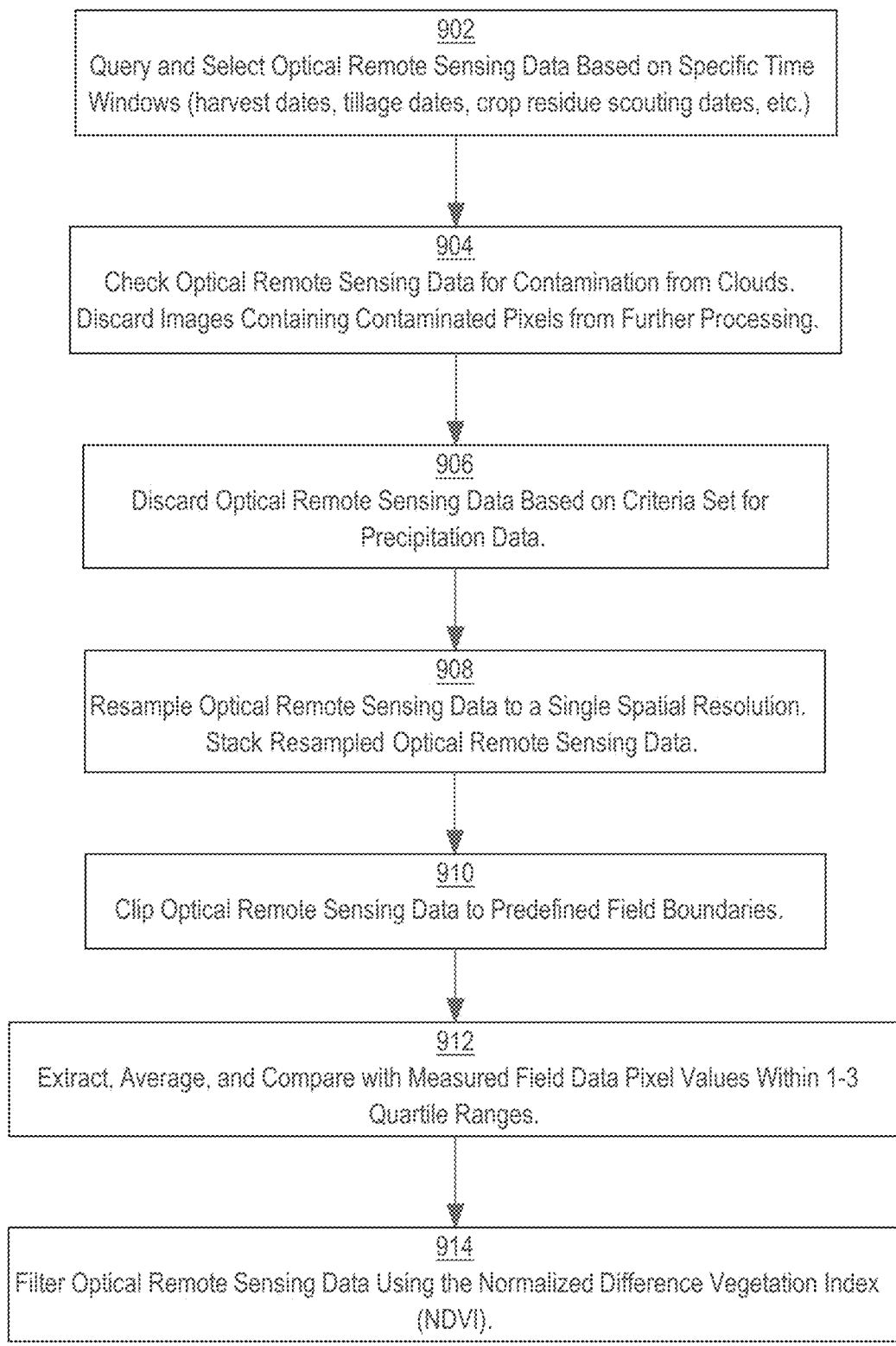
FIG. 9 depicts an example method of preprocessing optical remote sensing data prior for use as agronomic training data for a machine learning model.

FIG. 9 depicts an example method of preprocessing optical remote sensing data prior for use as agronomic training data for a machine learning model. As shown in FIG. 9, optical remote sensing data may be preprocessed prior to being used as agronomic training data to train the machine learning model. At step 902, the agricultural intelligence computer system queries and selects the optical remote sensing data based on a specific time window. Optical remote sensing data may be associated with the corresponding measured field data based on identifier data from one or more agronomic fields. Thus, the optical remote sensing data may be queried and selected based on one or more of: harvest dates, tillage dates, or crop residue scouting dates provided in the corresponding measured field data.

Tillage operations may have an impact on the accuracy of CRC data collected from agronomic fields, thus, the time window may be selected to minimize the impact of tillage operations on CRC data. In one embodiment, if the crop residue scouting date of the one or more agronomic fields is later than harvest and tillage dates of the one or more agronomic fields, the query and selection of the corresponding optical remote sensing data starts from the crop residue scouting date until the number of days specified by users. If the crop residue scouting date of the one or more agronomic fields is before the tillage date of the one or more agronomic fields, the query and selection of the corresponding optical remote sensing data may start from the crop residue scouting date until the number of days specified by users or the tillage date, whichever is earlier. If the crop residue scouting date of the one or more agronomic fields is the same as the tillage date, the query and selection of the corresponding optical remote sensing data may start from the next day until the number of days specified by users. Dates associated with the one or more agronomic fields may be graphically represented on a timeline and caused to display on a field manager computing device 104. For example, a timeline, representing an agronomic field, may include harvest dates, tillage dates, and scouting dates shown as particular points on the timeline. During preprocessing, agronomic training data selection may be based on specific portions of the timeline that are selected by a user 102 on a field manager computing device 104 as shown in FIG. 1.

In some embodiments, the query and selection of the corresponding optical remote sensing data starts from the crop residue scouting date until 20 days after the crop residue scouting date. In other embodiments, the optical remote sensing data with the closest date from the scouting date is selected. For example, when multiple remote sensing images are available for an agronomic field, the remote sensing image with the closest date from the scouting date of the agronomic field is selected.

4.1.1. Cloud Filter

In some embodiments, preprocessing of the optical remote sensing data prior to using them as agronomic training data for a machine learning model includes applying cloud filtering solution. The solutions may be provided by, for example, third-party providers. Examples of the applicable solutions include the cloud filter solutions that are compatible with the preprocessing platform (or the agricultural intelligence computer), and that are scalable and flexible. The compatibility usually includes the compatibility with the operating system(s) and web browsers used by the platform.

The scalability of the cloud filter solutions usually means that there are no scalability issues if an organization increases or decreases in size. Most cloud-based filtering service solutions allow access to the solutions by a large band of users (i.e., between 101 and 200 users).

The flexibility of the cloud filter solutions usually means that the solutions provide customization functionality for creating and modifying, for example, digital masks that then can be applied to digital images to filter out the depiction of the clouds from the images.

Cloud filtering solutions are usually configured to manage large data sets, including large quantities of digital images. The solutions may include data refinery is to enable Artificial Intelligence (AI) development at scale.

The data refinery may be configured to automatically ingest imagery from sensors including, for example, NASA and European Space Agency satellites, as well as ground-based detectors and weather data. Powerful data ingest pipelines included in the cloud filtering solutions may perform continuous loading and pre-processing at speeds up to 20 gigabytes per second and preprocess the data to make them AI-ready.

4.1.2. Vegetation/Snow Filter

In some embodiments, preprocessing of the optical remote sensing data prior to using them as agronomic training data for a machine learning model includes applying vegetation and snow filtering solution. The solutions may be provided by, for example, third-party providers. The general concept of filtering out depictions of vegetations and depictions of snow from digital images is based on designing and implementing specialized filters capable of identifying those pixels in the images that depict vegetation and/or snow, and then process the images without considering the masked pixels. Designing the mask is usually based on implementing rules of optics and physics. Some of the rules are based on a simple observation that when light interacts with any object, certain wavelengths are absorbed, reflected, or refracted. This is especially true when it comes to plants because they draw a significant portion of their energy through photosynthesis by absorbing the sun energy and converting the sun energy into glucose. Developing of the filters may include in depth analysis of, for example, vegetation indices, the Simple Ratio Index, the Atmospherically Resistant Vegetation Index, and the Photochemical Reflectance Index (PRI). Providers of the vegetations and/or snow filtering solutions usually employ those approaches in generating the vegetation masks and/or snow masks.

At step 904, the agricultural intelligence computer system checks the optical remote sensing data received for contamination from clouds. This may include removing the contamination caused by, for example, depictions of clouds, depictions of cloud shadows, and the like. Removing the contamination may include generating and applying, for example, cloud mask layers to check for contaminated pixels in the images. The mask layers may be implemented as part of the agricultural intelligence computer or preprocessing platform or may be provided by third-party vendors.

In some embodiments, detection and filtering of clouds is performed using the method described in U.S. patent application Ser. No. 16/657,957, titled "Machine Learning Techniques for Identifying Cloud Shadows in Satellite Imagery." In the disclosed approach, a system receives a plurality of images of agronomic fields as well as data identifying pixels as clouds or cloud shadows in the images. The system trains a machine learning system, such as a convolutional encoder-decoder, using the images as inputs and the data identifying pixels as clouds as outputs. When the system receives an image of any agronomic field, the system uses the machine learning system, which has been already trained to classify pixels based on surrounding pixel values, to identify pixels in the image as cloud pixels or non-cloud pixels. Additionally, the system may use geometric techniques to identify candidate cloud shadow locations in the training data and train a second machine learning system to identify cloud shadow pixels using the images and candidate cloud shadow locations as inputs and data identifying pixels as cloud shadow pixels as outputs.

For optical remote sensing data received as pixel-based images 802, each pixel may be checked for whether the pixel is a non-cloud pixel, a cloud pixel, a cloud shadow pixel, or a NaN pixel. Cloud pixels, cloud shadow pixels, and NaN pixels may be classified as contaminated pixels. Cloud mask layers may be used to check for contaminated pixels. In one embodiment, optical remote sensing data received as pixel-based images containing one or more contaminated pixels is discarded from further processing. In another embodiment, specific contaminated pixel thresholds are defined by users. For example, users may define a cloud cover threshold of 70%. Thus, pixel-based images with more than 70% cloud cover pixels are discarded from further processing.

At step 906, the agricultural computer system discards optical remote sensing data based on certain criteria set for the precipitation data of the corresponding one or more agronomic fields. For example, optical remote sensing data may be discarded based on the number of consecutive days in which no precipitation is collected prior to the acquisition of the corresponding optical remote sensing data. All optical remote sensing data may be discarded except for the optical remote sensing data with the corresponding precipitation data showing that there were at least three consecutive no-precipitation days before the acquisition of the optical remote sensing data.

At step 908, the agricultural intelligence computer system resamples optical remote sensing data received as pixel-based images 802 to a single spatial resolution. In some embodiments, optical remote sensing data received as pixel-based images comprising a plurality of different frequency bands with various spatial resolutions are resampled to a spatial resolution of 10 m. Spectral indices may be generated using the 10 m resampled frequency band pixel-based images. A plurality of resampled pixel-based images comprising a plurality of different frequency bands may be stacked for further analysis 908. In another embodiment, pixel values of resampled pixel-based images may be defined using received measured field data of the corresponding one or more agronomic fields. For example, a 3-pixel×3-pixel grid (30 m×30 m) centered at the points of measurement supplied by the measured field data may be applied to the corresponding resampled pixel-based images at the corresponding locations in the resampled pixel-based images, with each pixel in the grid having the value of the corresponding measurements from the points of measurement. The mean pixel value of the nine pixels in the 3-pixel×3-pixel grid may be calculated for further analysis. Pixel values outside of 1-3 quartile ranges may be filtered out, while pixel values within 1-3 quartile ranges may be extracted, averaged, and compared with the measured field data 912.

At step 910, the agricultural intelligence computer system clips optical remote sensing data received as pixel-based images to predefined field boundaries of one or more corresponding agronomic fields.

At step 914, the agricultural intelligence computer system further filters optical remote sensing data using the Normalized Difference Vegetation Index (NDVI). In one embodiment, any optical remote sensing data corresponding to one or more agronomic fields with a mean NDVI greater than 0.20 is discarded from further processing. In other embodiments, the NDVI threshold may be set by a user.

4.2. Measured Field Data Preprocessing

Measured field data received by the agricultural intelligence system may require correction. For example, corrections in the measured field data may result from soil surface moisture conditions and measurement offsets.

In some embodiments, measured field data may be corrected by filtering and discarding unwanted measured field data. Measured field data corresponding to one or more agronomic fields with wet surfaces may be discarded. The determination of whether one or more agronomic fields have a wet surface may be based on retrieved precipitation data corresponding to the one or more agronomic fields.

In another embodiment, measured field data are quality checked for measurement offsets. For example, quality checking measured field data may comprise visually comparing photographs of points of measurement with the corresponding measurement values at the points of measurement; identifying photographs that do not visually conform with the corresponding measurement; and discarding the measured field data corresponding with the photograph/measurement pair.

4.3. Training Machine Learning Models

At step 710, using the above preprocessed agronomic training data received by the agricultural intelligence computer system, the agricultural intelligence computer system creates a machine learning model trained to predict agronomic field property data for one or more agronomic fields. In one embodiment, the machine learning model trained to predict agronomic field property data are a Gaussian process regression model. In another embodiment, the machine learning model is a multiple linear regression model.

Figure 10:
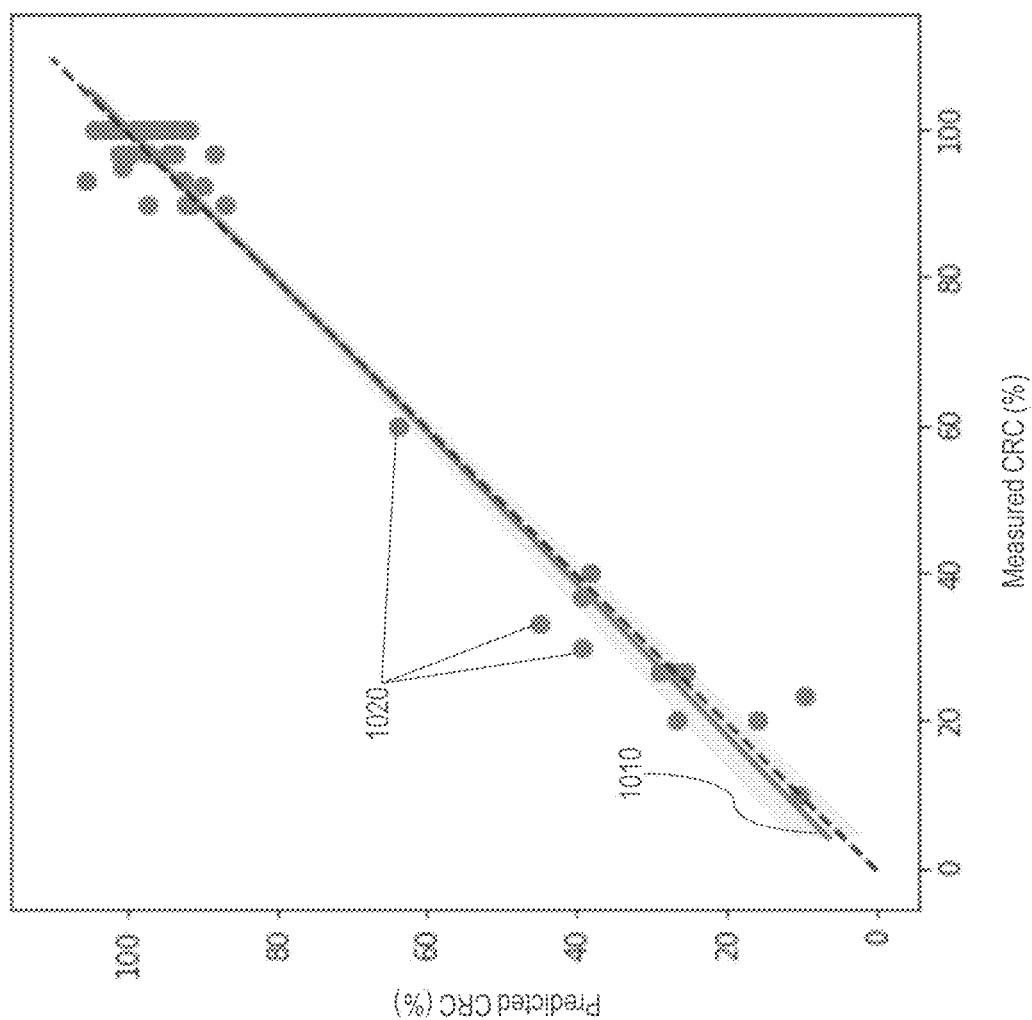
FIG. 10 depicts an example of correlation between measured CRC data and predicted CRC data at field level of a plurality of agronomic fields, represented as data points, from a trained multiple linear regression model.

FIG. 10 depicts an example of correlation 1010 between measured CRC data and predicted CRC data at field level of a plurality of agronomic fields, represented as data points 1020, from a trained multiple linear regression model. The correlation 1010 between measured CRC and predicted CRC is determined by calculating the linear correlation coefficient r using:

$$r = \frac{\sum \frac{(x_i - \bar{x})}{s_x} \frac{(y_i - \bar{y})}{s_y}}{n - 1}$$

where $\bar{x}$ and $s_x$ are the mean and standard deviation of the measured CRC for the plurality of agronomic fields, and $\bar{y}$ and $s_y$ are the mean and standard deviation of the predicted CRC for the plurality of agronomic fields, represented as data points 1020. The total number of agronomic fields measured/predicted, represented as data points 1020, is n.

In some embodiments, the agronomic field property data being predicted by the machine learning model is CRC data for one or more agronomic fields. The machine learning model may be trained with agronomic training data received by the agricultural intelligence computer system comprising one or more of: optical remote sensing data, measured field data, precipitation data, or the soil data from the SSURGO layers for a plurality of agronomic fields.

In addition to the agronomic training data, the machine learning model may be trained with one or more of: all frequency bands of the SENTINEL-2 satellite, NDTI, or NDVI. The machine learning model may be trained with agronomic training data received by the agricultural intelligence computer system from one or more different types of crops such as corn or soybean.

5. Predicting and Mapping Agronomic Field Property Data

Figure 7B:
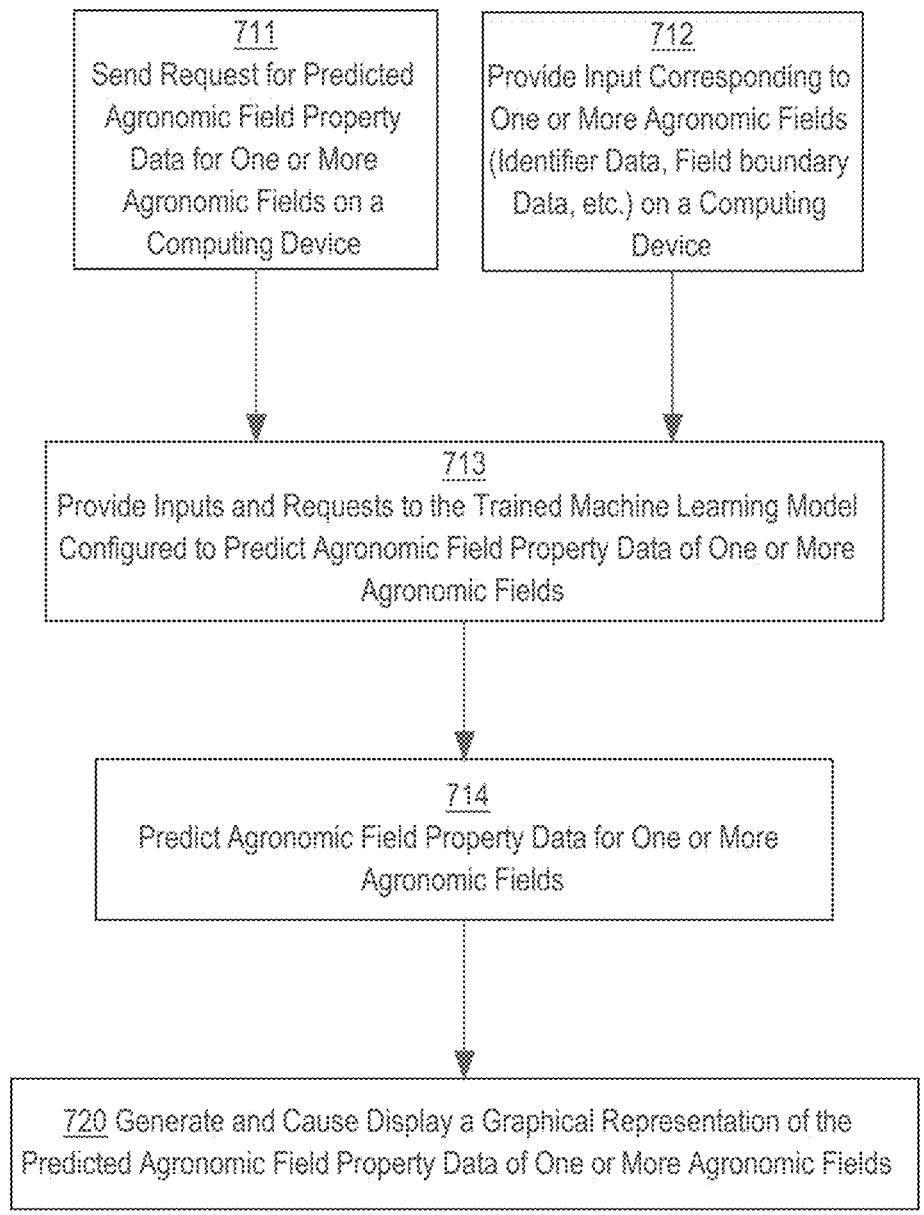
FIG. 7B depicts an example method of using a trained machine learning model to predict agronomic field property data.

At step 714, the agricultural intelligence computer system predicts and maps agronomic field property data for one or more agronomic fields using a trained machine learning model as shown in FIG. 7B.

FIG. 7B depicts an example method of using a trained machine learning model to predict agronomic field property data. At step 713, the agricultural intelligence computer system predicts agronomic field property data for one or more agronomic fields based on one or more inputs provided to a trained machine learning model at step 712. Inputs provided to the machine learning model may comprise one or more of: identifier data corresponding to one or more agronomic fields, field boundary data corresponding to one or more agronomic fields, geographical coordinates of one or more agronomic fields, optical remote sensing data of one or more agronomic fields, aerial images of one or more agronomic fields, precipitation data of one or more agronomic fields, the crop type planted on the corresponding one or more agronomic fields, planting date, prediction time windows, or the name of the one or more agronomic fields.

In some embodiments, inputs provided to the machine learning model are provided by users 102. Inputs may be provided to the machine learning model via an application on a field manager computing device 104. For example, the application may display a prompt requesting the user 102 to select a crop from a plurality of crops for which a trained prediction model is available.

At step 711, users 102 send requests for predicted agronomic field property data of one or more agronomic fields via an application on a field manager computing device 104. In some embodiments, agronomic field property data are predicted in response to one or more requests sent via an application on a field manager computing device 104. For example, a user 102 may provide inputs such as the geographic coordinates of a particular agronomic field and particular crop type via an application on an IPAD. The user 102 may then send a request for the predicted CRC data on the IPAD for the particular agronomic field and the particular crop.

The application used to provide input and send requests may be the mobile application CLIMATE FIELDVIEW, which is commercially available from The Climate Corporation, San Francisco, Calif. In another embodiment, the application used to provide input and send requests may be the desktop version of the application CLIMATE FIELDVIEW.

The predicted agronomic field property data of one or more agronomic fields may be CRC data. A graphical representation of the predicted agronomic field data may be generated.

Figure 11A:
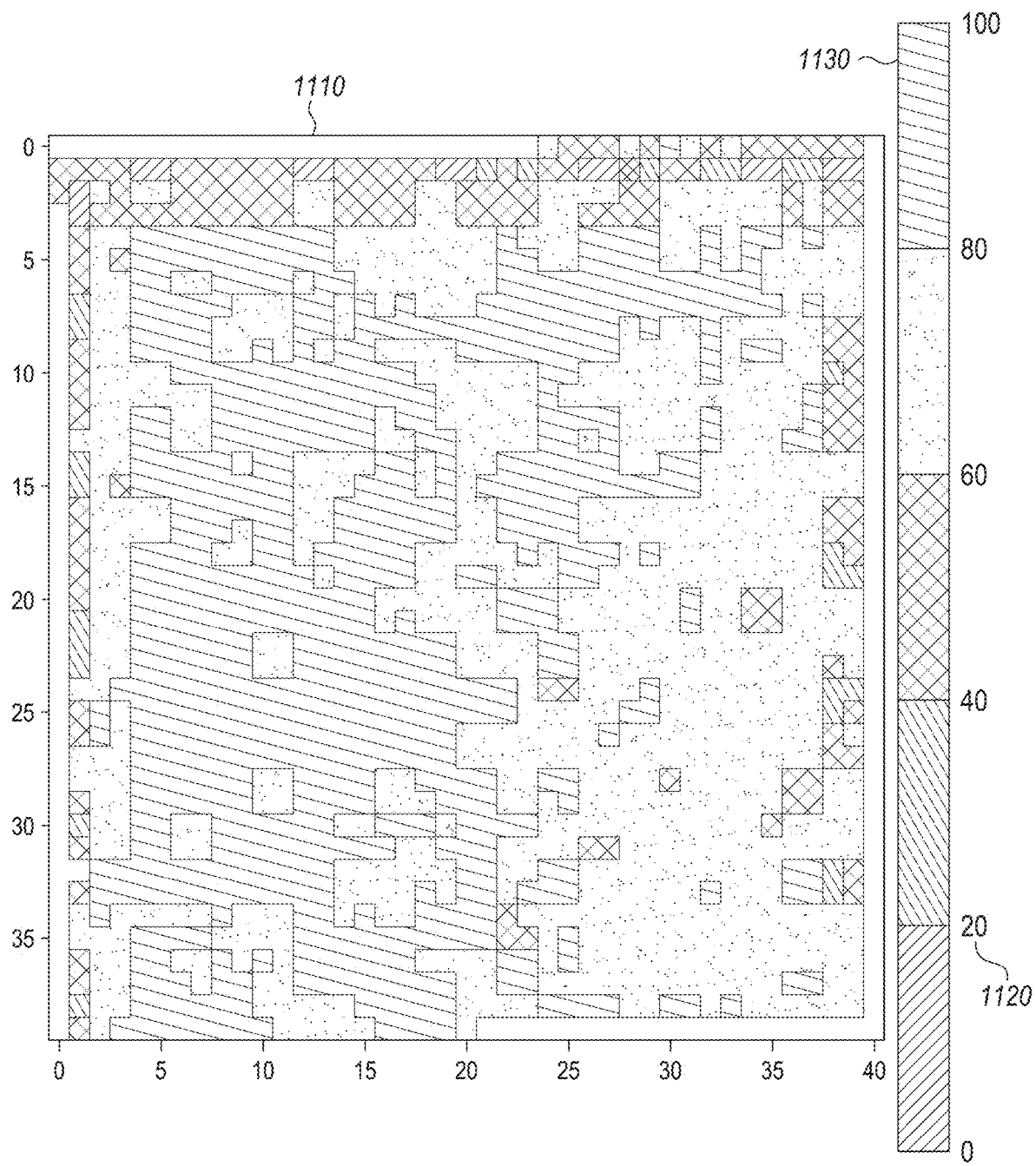
FIG. 11A depicts an example of a graphical representation of predicted agronomic field property data.

At step 720, the agricultural intelligence computer system generates the graphical representation of the predicted agronomic field property data at pixel level as shown in FIG. 11A.

FIG. 11A depicts an example of a graphical representation of predicted agronomic field property data. The predicted agronomic field property data may be mapped to one or more pixel-based images 1110 of the corresponding one or more agronomic fields, each pixel having a pixel value 1120 representing the predicted agronomic field property data of the corresponding location in the one or more agronomic fields. In some embodiments, each pixel value is represented by a particular color from a spectrum of colors 1130. In various embodiments, the graphical representation of the predicted agronomic field property data is caused to be displayed via an application on a field manager computing device 104. The application used to cause display of the graphical representation may be the mobile application CLIMATE FIELDVIEW, which is commercially available from The Climate Corporation, San Francisco, Calif. In another embodiment, the application used to provide input and send requests may be the desktop version of the application CLIMATE FIELDVIEW.

Additionally, or alternatively, the predicted agronomic field property data may be divided into a plurality of classes, with each class comprising a set of agronomic field property data with values in a specific range. For example, agronomic field property data predicted by a machine learning model configured to predict CRC data may be divided into three classes: the first class representing CRC data values less than or equal to 30%, the second class representing CRC data values greater than 30% and less than or equal to 70%, and the third class representing CRC data values greater than 70%. Value ranges defining each class may be adjusted by users 102. Examples of machine learning models configured to predict CRC may include the models that implement multiple linear regression approaches, the models that implement Gaussian process machine learning approaches, and other models. The models used to predict agronomic field property data may be scaled and customized for a particular agronomic application. The models may be customized to be able to access temporal dynamics of a residue cover between the short and tall corn.

In various embodiments, a graphical representation of the classes of the predicted agronomic field property data are generated. Similar to the graphical representation of predicted agronomic field property data, the classes representing specific ranges of predicted agronomic field property data values may be generated at pixel level as shown in FIG. 11B.

Figure 11B:
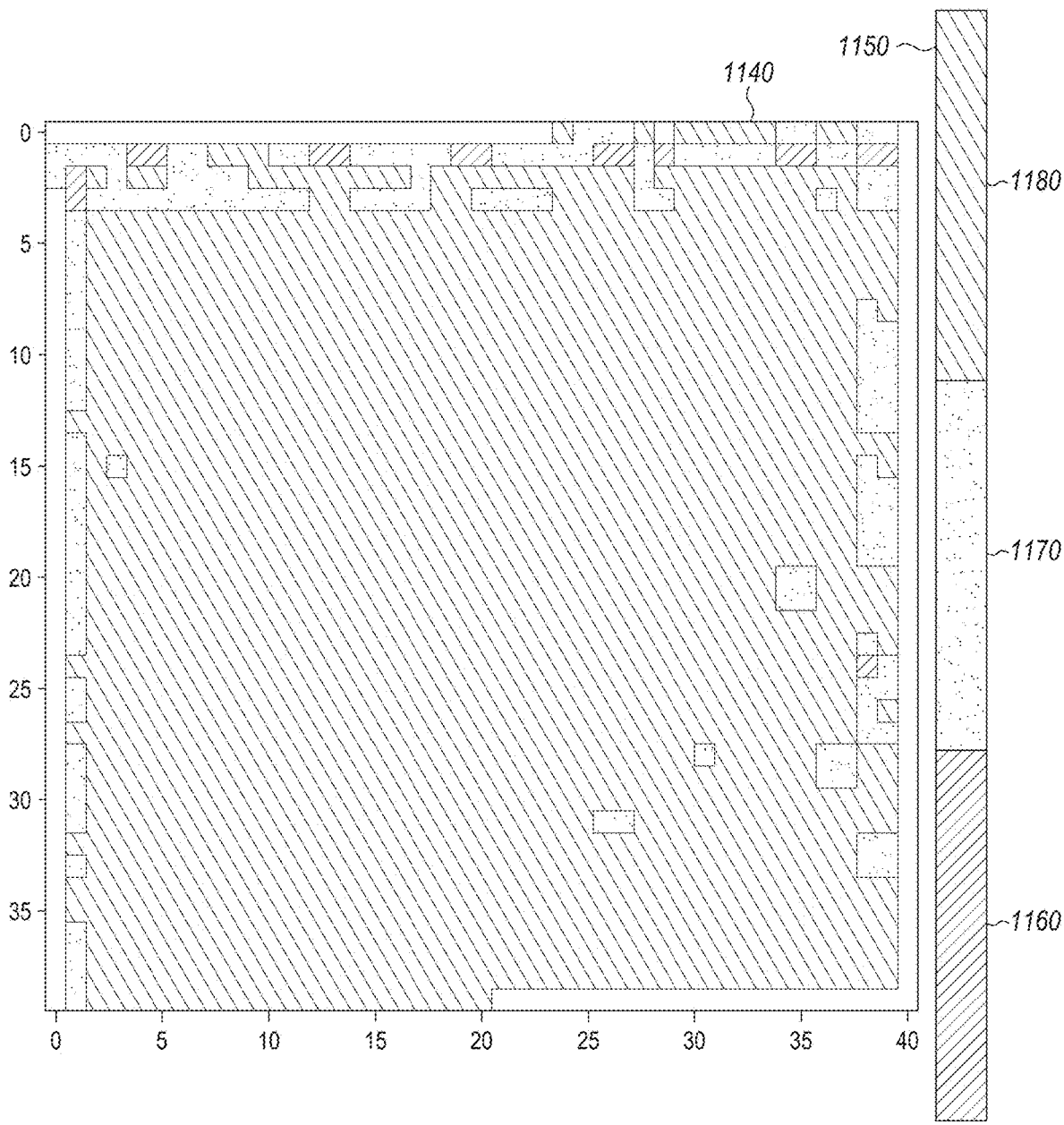
FIG. 11B depicts an example of a graphical representation of predicted agronomic field property data divided into a plurality of classes.

FIG. 11B depicts an example of a graphical representation of predicted agronomic field property data divided into a plurality of classes. The classes may be mapped to one or more pixel-based images 1140 of the corresponding one or more agronomic fields, each pixel representing a particular class of predicted agronomic field property data. Each class may be represented by a particular color 1150 and displayed by the corresponding pixels. The graphical representation of the predicted agronomic field property data classes may be caused to be displayed via an application on a field manager computing device 104. In one embodiment, the application used to cause display of the graphical representation is the mobile application CLIMATE FIELDVIEW, which is commercially available from The Climate Corporation, San Francisco, Calif.

Each class of the predicted agronomic field property data may be defined to derive more information corresponding to the one or more agronomic fields. In one embodiment, predicted CRC data of one or more agronomic fields is divided into three classes, with each class corresponding to a particular estimated tillage practice type. For example, CRC data values less than or equal to 30% may be defined as 'estimated conventional tillage type' 1160, CRC data values greater than 30% and less than or equal to 70% may be defined as 'estimated conservation tillage type' 1170, and the third class representing CRC data values greater than 70% may also be defined as 'estimated conservation tillage type' 1180. The information derived from the classification of agronomic field property data may be further used as agronomic training data for the machine learning model.

In some embodiments, inputs provided by users are used as agronomic training data to further train the machine learning model. Additionally, or alternatively, the predicted agronomic field property data may be further used as agronomic training data for the machine learning model.

Predicted agronomic field property data may be collected to investigate agronomic field property data variations within an agronomic field over a period of time. The collected data may be used to train a machine learning model to predict agronomic field property data of one or more agronomic fields for a specific future date.

For example, predicted CRC data of a particular agronomic field may be collected by the agricultural intelligence computer system at harvest dates, tillage dates, scouting dates, and planting dates. Using the collected agronomic field data and applying a time series analysis approach, the machine learning model may capture the CRC pattern over a period of time and be trained to extrapolate CRC data for future dates. In one embodiment, based on one or more future dates inputted by a user 102, graphical representations of predicted agronomic field property data for the requested agronomic field is caused to display on a field manager computing device 104. In another embodiment, a timeline for the requested agronomic field is generated and caused to display on a field manager computing device 104. A user 102 may select a specific point on the timeline and cause a graphical representation of the predicted agronomic field property data corresponding to the specific point in time to be displayed on the field manager computing device 104. The graphical representation of the predicted agronomic field property data may be a series of pixel-based images of the corresponding one or more agronomic fields, each pixel having a pixel value representing the predicted agronomic field data of the corresponding location in the one or more agronomic fields. The graphical representation may also be a chart of the predicted agronomic field data versus time.

In some embodiments, risk maps based on the predicted agronomic field property data for one or more agronomic fields are generated and displayed. For example, an erosion risk map layer may be generated based on predicted CRC data. Low CRC in an agronomic field may be associated with a high erosion risk. Thus, a pixel-based map of an agronomic field indicating areas with low CRC, and high erosion risk, may be generated and displayed. The threshold for risks may be adjusted by a user 102. For example, a user may configure the agricultural intelligence computer system to generate an erosion risk map that displays CRC data values lower than 5% as high erosion risk. In another embodiment, one or more risk maps are selected by the user 102 from a plurality of risk maps. Risk maps layers may be overlaid onto graphical representations of predicted agronomic field property data. For instance, a nutrient depletion pixel-based risk map layer may be overlaid onto a pixel-based image of CRC data of an agronomic field. Risk maps may comprise, but not limited to, erosion risk maps, nutrient depletion risk maps, water runoff risk maps, and disease risk assessment maps.

In some embodiments, recommendations to improve agricultural practices are generated and displayed based on the predicted agronomic field property data. Recommendations may include actions addressing the risks highlighted in the risk maps. Other recommendations may comprise, but not limited to, tillage practice adjustments, tillage date adjustments, harvest date adjustments, plant date adjustments, crop type adjustments, risk management, and seeding recommendations. For example, the generated recommendations, based on predicted CRC data, may be tillage practice recommendations for the agronomic field, and the timing for planting seeds to achieve the highest yield possible. The recommendation may also include instructions for seedbed preparation. In other embodiments, a prescription map for variable-rate seeding is generated based on the predicted agronomic field property data.

The generated risk maps and recommendations may be transmitted to a computer or a controller that controls a mechanical machine, such as tillage equipment, so as to cause the mechanical machine to execute the recommendations. For example, if the generated recommendations include switching from conventional tillage practices to conservation tillage practices, then specific instructions may be transmitted to a controller installed on tillage equipment to adjust the hardware on the tillage equipment before the tillage equipment starts the tillage process.

6. Technical Benefits of Certain Embodiments

The systems and methods described herein provide a practical application of using machine learning models and optical remote sensors to process optical remote sensing data and satellite data to solve a specific technical problem which arises when there is a need for determining agronomic field property data automatically, accurately and efficiently. For example, the machine learning models trained to predict agronomic field property data and the sensors configured to provide the sensing data and the satellite data can cooperate with an agricultural intelligence computer system to improve the methods for automatically predicting field property data, such as CRC data. The agronomic field property data are predicted in a way that is easy to scale across geography, without any on ground measurements, geographic limitations, or direct input from growers. This allows the agricultural intelligence computer system to practically apply machine learning techniques to solve technical problems related to the automatic prediction of the agronomic field property data. For example, the systems and methods described herein may allow integration of a trained and configured machine learning model into an automated agronomic tillage system, where the predicted agronomic field property data, such as CRC data, are used to modify the tillage practices of the automated agronomic tillage system resulting in increased yield of a particular agronomic field.

Additionally, the systems and the methods described herein allow the agricultural intelligence computer system to use novel processes to generate improved optical remote sensing data, improved machine learning models, and improved map displays. For example, in order to increase the accuracy of the data generated by the machine learning model, the agronomic training data may undergo several rounds of rigorous preprocessing before the data are provided to the machine learning model. The preprocessing may include using the agricultural intelligence computer system to filter the agronomic training data to comply with, for example, the time constraints, or to identify and remove that data that have been impacted by a cloud cover. The preprocessing may also include using the agricultural intelligent computer system to identify and remove optical remote sensing data that may be contaminated because they were acquired from the agronomic fields for which precipitation readings were recorded immediately prior to the data acquisition.

What is claimed is:

1. A computer-implemented method comprising:
receiving, at an agricultural intelligence computer system, agronomic training data, wherein the agronomic training data comprises optical remote sensing data generated by optical remote sensors for a plurality of first agronomic fields, precipitation data for the plurality of first agronomic fields, and measured field data for the plurality of first agronomic fields, the optical remote sensing data including short-wave infrared (SWIR) band data indicating reflectance as a function of wavelength;
training a machine learning model, at the agricultural intelligence computer system, using a part of the optical remote sensing data, relative water content (RWC) of crop residue in the plurality of first agronomic fields based on the precipitation data, and the measured data of the agronomic training data, wherein the machine learning model is configured to predict agronomic field property data, wherein the part of the optical remote sensing data is defined by a wavelength range of 2100-2300 nm;
in response to receiving a request from a client computing device for agronomic field property data for one or more agronomic fields, automatically predicting the agronomic field property data for the one or more agronomic fields, using the trained machine learning model, wherein the agronomic field property data comprises crop residue cover (CRC) data indicating one or more percentages of one or more ground surface residue coverages for the one or more agronomic fields;
based on the agronomic field property data, automatically generating a first graphical representation;
causing to display the first graphical representation on the client computing device.

2. The method of claim 1, wherein the first graphical representation depicts a high erosion risk map that indicates CRC data values that are lower than a certain percentage value;
wherein the method further comprises based on agronomic field property data values of the predicted agronomic field property data, dividing the agronomic field property data into a plurality of classes, wherein each class corresponds to a range of the agronomic field property data values;
assigning an estimated tillage practice type to each class;
based on the estimated tillage practice types, generating a second graphical representation;
causing to display the second graphical representation on the client computing device;
wherein the second graphical representation depicts one of: an erosion risk map, a nutrient depletion risk map, a water runoff risk map, or a disease risk assessment map;
generating recommendations determined based on, at least in part, the high erosion risk map that indicates CRC data; wherein the recommendations comprise one or more of: tillage practice adjustments, tillage date adjustments, harvest date adjustments, plant date adjustments, crop type adjustments, risk management, or seeding recommendations;

transmitting the recommendations to a controller that controls a mechanical machine so as to cause the mechanical machine to execute the recommendations.

3. The method of claim 1, wherein the first graphical representation comprises one or more pixel-based images;
mapping the predicted agronomic field property data onto the one or more pixel-based images, wherein each pixel of the one or more pixel-based images corresponds to an agronomic field property data value;
generating a set of colors, wherein each color corresponds to an agronomic field property data value;
assigning colors from the set of colors to each pixel based on the agronomic field property data values of each pixel.

4. The method of claim 2, wherein the second graphical representation comprises one or more pixel-based images;
mapping the plurality of classes onto the one or more pixel-based images, wherein each pixel of the one or more pixel-based images corresponds to one or more classes of the plurality of classes;
generating a set of colors, wherein each color corresponds to one or more classes of the plurality of classes;
assigning colors from the set of colors to the pixels based on the one or more classes of the plurality of classes of each pixel.

5. The method of claim 1, wherein the machine learning model is one of:
a Gaussian process regression model, or a multiple linear regression model.

6. The method of claim 1, further comprising:
inputting, from the client computing device, data associated with the one or more agronomic fields, wherein the data comprises one or more of: an identifier, a crop type, field boundary definition, a location definition, or prediction time window definition.

7. The method of claim 1, further comprising:
selecting a set of optical remote sensing data from the optical remote sensing data based on a time window;
using the set of optical remote sensing data as agronomic training data.

8. The method of claim 1, further comprising:
based on the received optical remote sensing data, detecting contaminated optical remote sensing data from the received optical remote sensing data, wherein the contaminated optical remote sensing data are received optical remote sensing data affected by clouds;
determining whether the contaminated optical remote sensing data has reached a contamination threshold;
in response to determining that the contaminated optical remote sensing data has reached the contamination threshold, discarding the contaminated optical remote sensing data.

9. The method of claim 1, further comprising:
receiving, at the agricultural intelligence computer system, new agronomic training data;
in response to receiving the new agronomic training data, retraining the machine learning model with the new agronomic training data.

10. One or more non-transitory computer-readable storage media storing one or more computer instructions which, when executed by one or more computer processors, cause the one or more computer processors to perform:
receiving, at an agricultural intelligence computer system, agronomic training data, wherein the agronomic training data comprises optical remote sensing data generated by optical remote sensors for a plurality of first agronomic fields, precipitation data for the plurality of first agronomic fields, and measured field data for the plurality of first agronomic fields, the optical remote sensing data including short-wave infrared (SWIR) band data indicating reflectance as a function of wavelength;
training a machine learning model, at the agricultural intelligence computer system, using a part of the optical remote sensing data, relative water content (RWC) of crop residues in the plurality of first agronomic fields based on the precipitation data, and the measured data of the agronomic training data, wherein the machine learning model id configured to predict agronomic field data, wherein the part of the optical remote sensing data is defined by a wavelength range of 2100-2300 nm;
in response to receiving a request from a client computing device for agronomic field property data for one or more agronomic fields, automatically predicting the agronomic field property data for the one or more agronomic fields, using the trained machine learning model, wherein the agronomic field property data comprises crop residue cover (CRC) data indicating one or more percentages of one or more ground surface residue coverages for the one or more agronomic fields;
based on the agronomic field property data, automatically generating a first graphical representation;
causing to display the first graphical representation on the client computing device.

11. The one or more non-transitory computer-readable storage media of claim 10, wherein the first graphical representation depicts a high erosion risk map that indicates CRC data values that are lower than a certain percentage value;
wherein the one or more non-transitory computer-readable storage media stores additional instructions for:
based on agronomic field property data values of the predicted agronomic field property data, dividing the agronomic field property data into a plurality of classes, wherein each class corresponds to a range of the agronomic field property data values;
assigning an estimated tillage practice type to each class;
based on the estimated tillage practice types, generating a second graphical representation;
causing to display the second graphical representation on the client computing device;
wherein the second graphical representation depicts one of: an erosion risk map, a nutrient depletion risk map, a water runoff risk map, or a disease risk assessment map;
generating recommendations determined based on, at least in part, the high erosion risk map that indicates CRC data; wherein the recommendations comprise one or more of: tillage practice adjustments, tillage date adjustments, harvest date adjustments, plant date adjustments, crop type adjustments, risk management, or seeding recommendations;
transmitting the recommendations to a controller that controls a mechanical machine so as to cause the mechanical machine to execute the recommendations.

12. The one or more non-transitory computer-readable storage media of claim 10, wherein the first graphical representation comprises one or more pixel-based images;
mapping the predicted agronomic field property data onto the one or more pixel-based images, wherein each pixel of the one or more pixel-based images corresponds to an agronomic field property data value;
generating a set of colors, wherein each color corresponds to an agronomic field property data value;

assigning colors from the set of colors to each pixel based on the agronomic field property data values of each pixel.

13. The one or more non-transitory computer-readable storage media of claim 11, wherein the second graphical representation comprises one or more pixel-based images;
   mapping the plurality of classes onto the one or more pixel-based images, wherein each pixel of the one or more pixel-based images corresponds to one or more classes of the plurality of classes;
   generating a set of colors, wherein each color corresponds to one or more classes of the plurality of classes;
   assigning colors from the set of colors to the pixels based on the one or more classes of the plurality of classes of each pixel.

14. The one or more non-transitory computer-readable storage media of claim 10, wherein the machine learning model is one of:
   a Gaussian process regression model, or a multiple linear regression model.

15. The one or more non-transitory computer-readable storage media of claim 10, storing additional instructions for:
   inputting, from the client computing device, data associated with the one or more agronomic fields, wherein the data comprises one or more of: identifier data, crop type data, field boundary data, location data, or prediction time window data.

16. The one or more non-transitory computer-readable storage media of claim 10, storing additional instructions for:
   selecting a set of optical remote sensing data from the optical remote sensing data based on a time window;
   using the set of optical remote sensing data as agronomic training data.

17. The one or more non-transitory computer-readable storage media of claim 10, storing additional instructions for:
   based on the received optical remote sensing data, detecting contaminated optical remote sensing data from the received optical remote sensing data, wherein the contaminated optical remote sensing data are received optical remote sensing data affected by clouds;
   determining whether the contaminated optical remote sensing data reaches a contamination threshold; and
   discarding the contaminated optical remote sensing data where the contamination threshold is reached.

18. The one or more non-transitory computer-readable storage media of claim 10, storing additional instructions for:
   receiving, at the agricultural intelligence computer system, new agronomic training data; and
   in response to receiving the new agronomic training data, retraining the machine learning model with the new agronomic training data periodically.

19. The method of claim 1, wherein training the machine learning model further uses a part of the optical remote sensing data define by a wavelength range of 1600-1700 nm.

20. The one or more non-transitory computer-readable storage media of claim 10, wherein training the machine learning model further uses a part of the optical remote sensing data defined by a wavelength range of 1600-1700 nm.

* * * * *